US012111100B2

(12) United States Patent
Cooper

(10) Patent No.: US 12,111,100 B2
(45) Date of Patent: Oct. 8, 2024

(54) CONTAINERISED LNG LIQUEFACTION UNIT AND ASSOCIATED METHOD OF PRODUCING LNG

(71) Applicant: Woodside Energy Technologies Pty Ltd, Perth (AU)

(72) Inventor: Steven Cooper, Perth (AU)

(73) Assignee: Woodside Energy Technologies Pty Ltd, Perth (AU)

(*) Notice: Subject to any disclaimer, the term of this patent is extended or adjusted under 35 U.S.C. 154(b) by 569 days.

(21) Appl. No.: 16/493,864

(22) PCT Filed: Mar. 14, 2018

(86) PCT No.: PCT/AU2018/050235
§ 371 (c)(1),
(2) Date: Sep. 13, 2019

(87) PCT Pub. No.: WO2018/165712
PCT Pub. Date: Sep. 20, 2018

(65) Prior Publication Data

US 2020/0080771 A1 Mar. 12, 2020

(30) Foreign Application Priority Data

Mar. 14, 2017 (AU) ................................ 2017900896

(51) Int. Cl.
*F25J 1/02* (2006.01)
*F25J 1/00* (2006.01)
*F17C 13/02* (2006.01)

(52) U.S. Cl.
CPC ........... *F25J 1/0022* (2013.01); *F25J 1/0055* (2013.01); *F17C 13/02* (2013.01);
(Continued)

(58) Field of Classification Search
CPC ........ F25J 1/0022; F25J 1/0265; F25J 1/0264; F25J 1/0271; F25J 1/0272; F25J 2290/42
See application file for complete search history.

(56) References Cited

U.S. PATENT DOCUMENTS 10,788,259 B1 * 9/2020 Tomlinson ............. F25J 1/0262
2002/0174678 A1 11/2002 Wilding et al.
(Continued)

FOREIGN PATENT DOCUMENTS

AU 2013202033 A1 10/2014
CN 1295224 A 5/2001
(Continued)

OTHER PUBLICATIONS

International Preliminary Report on Patentability for PCT/AU2018/050235, dated Jun. 4, 2018, 4 pages.
(Continued)

*Primary Examiner* — Brian M King
(74) *Attorney, Agent, or Firm* — Edell, Shapiro & Finnan, LLC

(57) ABSTRACT

An LNG production plant is constructed from a plurality of containerised LNG liquefaction units. Each containerised LNG liquefaction unit can produce a predetermined quantity of LNG. For example, up to 0.3 MPTA. A manifold system enables connection between the plurality of containerised LNG liquefaction units, and at least a feed stream of natural gas, a source of electrical power, and an LNG storage facility. The production capacity of the plant is incrementally changed by connecting or disconnecting containerised LNG liquefaction units to or from the plant via the manifold system. Each unit contains its own liquefaction plant having a closed loop SMR circuit. Refrigerant within the SMR circuit is circulated solely by pressure differential generated by refrigerant compressors in the liquefaction plant.

30 Claims, 12 Drawing Sheets

(52) U.S. Cl.
CPC ....... *F17C 2250/043* (2013.01); *F25J 1/0274* (2013.01); *F25J 2220/64* (2013.01); *F25J 2230/08* (2013.01)

(56) References Cited

U.S. PATENT DOCUMENTS

| | | | | |
|---|---|---|---|---|
| 2007/0193303 | A1* | 8/2007 | Hawrysz | F25J 1/0294 62/620 |
| 2009/0006693 | A1 | 1/2009 | Dunn et al. | |
| 2010/0170297 | A1 | 7/2010 | Oka et al. | |
| 2010/0263405 | A1* | 10/2010 | Durand | F25J 1/0288 62/6 |
| 2011/0094261 | A1 | 4/2011 | Wilding et al. | |
| 2013/0019632 | A1* | 1/2013 | Werne | F25J 1/0298 62/606 |
| 2013/0232916 | A1 | 9/2013 | Utal et al. | |
| 2014/0318178 | A1 | 10/2014 | Del Campo | |
| 2015/0143843 | A1* | 5/2015 | Chinn | F25J 1/0249 29/401.1 |
| 2015/0183621 | A1* | 7/2015 | Koch | B66C 17/20 212/315 |
| 2016/0010916 | A1 | 1/2016 | Byfield | |
| 2016/0069609 | A1* | 3/2016 | Van Aken | F25J 3/067 62/614 |
| 2016/0097489 | A1* | 4/2016 | Madé | F25J 1/004 62/50.5 |
| 2016/0138861 | A1* | 5/2016 | Ohart | F25J 1/023 62/613 |
| 2016/0178129 | A1* | 6/2016 | Chen | F25J 1/0045 60/671 |
| 2017/0009940 | A1* | 1/2017 | Cavagne | F17C 13/001 |

FOREIGN PATENT DOCUMENTS

| | | | |
|---|---|---|---|
| CN | 202532917 | U | 11/2012 |
| CN | 103629893 | A | 3/2014 |
| CN | 104302961 | A | 1/2015 |
| CN | 204079929 | U | 1/2015 |
| CN | 105190210 | A | 12/2015 |
| CN | 105890281 | A | 8/2016 |
| CN | 106268298 | A | 1/2017 |
| EP | 1132698 | A1 | 9/2001 |
| FR | 2108901 | A1 | 5/1972 |
| JP | 4-27388 | U | 3/1992 |
| JP | H04-027388 | U | 3/1992 |
| JP | 2008-503609 | A | 2/2008 |
| JP | 2016-065643 | A | 4/2016 |
| JP | 2016-514823 | A | 5/2016 |
| KR | 10-2013-0009064 | A | 1/2013 |
| KR | 20150135503 | A | 12/2015 |
| KR | 20160136869 | A | 11/2016 |
| RU | 88099 | U1 | 10/2009 |
| WO | 2009006693 | A1 | 1/2009 |

OTHER PUBLICATIONS

International Search Report and Written Opinion for PCT/AU2018/050235, dated Apr. 6, 2018, 10 pages.
Supplementary European Search Report, EP18767242, Jun. 5, 2020, 15 pages.
Lewis, “Small-scale LNG applications make progress”, http://www.gasprocessingnews.com (2013), 4 pages.
“Breaking the barriers of small-scale LNG: Galileo launches the Cryobox”, May 2, 2013, 4 pages.
Habibullah et al., “LNG Conceptual Design Strategies”, Worley Parsons resources & energy, Mar. 31, 2009, 18 pages.
AU Examination Report, AU Application No. 2018201851, Feb. 18, 2020, 5 pages.
AU Examination Report, AU Application No. 2018201851, Apr. 23, 2020, 7 pages.
AU Examination Report, AU Application No. 2018201851, May 26, 2020, 4 pages.
English Translation of Office Action in counterpart Korean Application No. 10-2019-7030051, mailed Jul. 28, 2022, 17 pages.
English Translation of Office Action in counterpart Israeli Application No. 269301, mailed Apr. 5, 2022, 9 pages.
English Translation of Office Action in counterpart CN Application No. 202210128895.1, mailed Jun. 28, 2023, 11 pages.
Substantive Official Action Report Letter based on MX Office Action, mailed Aug. 15, 2023, 4 pages.
English Translation of Office Action in counterpart to Japanese Application No. 2019-550813, mailed Oct. 25, 2022, 3 pages.
Office Action in counterpart to Malaysian Application No. PI2019005151, mailed Dec. 19, 2022, 3 pages.
Office Action in counterpart to Canadian Application No. 3,055,601 mailed Dec. 5, 2023, 7 pages.

* cited by examiner

CONTAINERISED LNG LIQUEFACTION UNIT AND ASSOCIATED METHOD OF PRODUCING LNG

CROSS REFERENCE TO RELATED APPLICATIONS

This application is a national stage of International Patent Application No. PCT/AU2018/050235, filed Mar. 14, 2018, which claims priority from Australian Patent Application No. AU 2017900896, filed Mar. 14, 2017, the disclosures of which are incorporated herein by reference in their entireties.

TECHNICAL FIELD

A containerised LNG liquefaction unit and associate method of producing LNG are disclosed. The unit and method may be used to scale up or scale down LNG production on an as needs basis by switching in or switching out additional LNG liquefaction units.

BACKGROUND ART

Large scale production of LNG requires enormous capex often in the order several tens of billion US dollars. For example Chevron's Gorgon project has a reported cost in the order of US$54 billion (http://www.energy-pubs.com.au/blog/cost-of-gorgon-increases/), for a production capacity of 15.6 MTPA from three LNG trains.

An LNG train is an extremely complex structure comprising many interconnected processing plant, systems and equipment including pre-treatment plants for removal of water, acid gas, mercury and C5+; a cryogenic heat exchanger; compressors; gas, electric or steam drives; and banks of air cooled heat exchangers.

In order to reduce capex it has been proposed to construct a LNG train as several (for example three to five) separate modules off-site which are subsequently transported to a production site and interconnected with each other. The separate modules can be inspected and tested prior to being transported production site. Such modular trains are proposed with the capacity in the order of 3-5 MPTA.

While it is believed that the modularisation of the LNG train in the above manner may assist in reducing overall capex it nonetheless remains in the order of billions of US dollars. Additionally, increasing production capacity is generally only subsequently achievable by installing further trains, and then only in "units" of 3-5 MPTA.

The above references to the background art do not constitute an admission that the art forms a part of the common general knowledge of a person of ordinary skill in the art. The above references are also not intended to limit the application of the LNG liquefaction unit and method of producing LNG as disclosed herein.

SUMMARY OF THE DISCLOSURE

In one aspect there is disclosed a LNG liquefaction unit comprising:

a LNG liquefaction plant; and a transportable container wherein the LNG liquefaction plant is wholly contained within the transportable container; and one or more connectors supported on the container the one or more connectors arranged to enable separate and isolated flow of services and fluids, the one or more connectors arranged to enable a feed stream gas to flow into the container, a flow of LNG out of the container and connection of the LNG liquefaction plant to an external source of electrical power.

In one embodiment the one or more connecters are further arranged to facilitate a removal of heat from the container. To this end the one or more connectors may be arranged to enable a flow of a heat transfer fluid into and out of the container. The fluid may for example be water.

In one embodiment the one or more connectors comprise a single multi-port connector enabling the simultaneous connection to corresponding conduits and couplings for each of the services and fluids.

In one embodiment the transportable container is hermetically sealed.

In one embodiment the connector includes a heat transfer fluid inlet port and outlet port enabling the removal of energy from the container.

In one embodiment the connector includes a drain enabling removal of gases or liquids from the container.

In one embodiment the connector includes one or more utility fluid port enabling supply of fluids to facilitate operation of equipment and/or instrumentation of the LNG liquefaction plant.

In one embodiment the container is filled with an inert fluid.

In one embodiment the inert fluid comprises nitrogen gas.

In one embodiment the inert fluid when is pressurised to a positive pressure relative to atmospheric pressure.

In one embodiment the container is of an exterior size and shape of an ISO shipping container.

In one embodiment the unit comprises a monitoring system capable of monitoring status and performance of the LNG liquefaction plant and providing remotely accessible status and performance information pertaining to the liquefaction unit.

In one embodiment the monitoring system is further capable of monitoring environmental characteristics within the container.

In one embodiment the environmental characteristics include one or more of: atmospheric pressure within the container; composition of the atmosphere in the container; temperature within the container; and temperature of one or more selected components of the LNG production plant.

In one embodiment the LNG production plant comprises a main cryogenic heat exchanger (MCHE); and a refrigerant circuit for cycling a refrigerant through the MCHE the refrigerant circuit including at least one compressor and at least one electric motor for driving the at least one compressor.

In one embodiment the MCHE has an aspect ratio of where the width and/or depth is greater than the height.

In one embodiment the MCHE comprises two or more separate heat exchangers.

In one embodiment cooling duty of the MCHE is split between the two or more separate heat exchangers In one embodiment each separate heat exchanger has an aspect ratio of ≥1.

In one embodiment the MCHE is arranged to operate with a thermal stress of up to 100° C. per metre in a vertical direction.

In one embodiment the MCHE comprises a 3-D printed heat exchanger.

In one embodiment wherein, the electric motor is arranged to rotate the at least one compressor a speed of at least 4,000 rpm or up to about 25,000 RPM.

In one embodiment the at least one compressor comprises a low-pressure compressor and a high pressure compressor.

In one embodiment the at least one motor comprises a single motor which drives both the low-pressure compressor and the high pressure compressor.

In one embodiment the refrigerant circuit includes at least one separator for separating liquid and gas phases of the refrigerant, wherein the at least one separator has an aspect ratio of greater ≥1.

In one embodiment the LNG liquefaction unit comprises at least one intercooler in the refrigerant circuit between the at least one compressor and the separator.

In one embodiment the container comprises a vent.

In one embodiment the LNG liquefaction unit comprises a kill port arranged to facilitate the injection of a material capable of preventing air from accumulating in, or displacing air from, the container.

In one embodiment the liquefaction plant comprises a pre-treatment facility arranged to remove one or more of: water, sour gases, mercury and carbon dioxide from the feed stream gas prior to liquefaction.

In one embodiment the LNG liquefaction plant is configured to produce up to 0.30 MTPA of LNG.

In one embodiment LNG liquefaction plant is configured to produce up to 0.10 MTPA of LNG.

In a second aspect there is disclosed an LNG production plant comprising: a plurality of containerised LNG liquefaction units, each containerised LNG liquefaction unit arranged to produce a predetermined quantity of LNG in the order of 0.01 to 0.30 MTPA; and a manifold system enabling connection between the plurality of containerised LNG liquefaction units, and at least a feed stream of natural gas, a source of electrical power, and an LNG storage facility. In some embodiments the predetermined quantity of LNG in the order of 0.01 to 0.10 MTPA.

In one embodiment some of the plurality of LNG liquefaction units are stacked on top of each other.

In one embodiment the LNG production plant comprises at least one bank of stacked LNG liquefaction units and wherein the manifold system runs adjacent to the at least one bank of the LNG liquefaction units.

In one embodiment the at least one bank comprises at least two banks of the stacked LNG liquefaction units wherein the manifold system runs between mutually adjacent banks or about an outside of the banks.

In one embodiment the LNG liquefaction units and the manifold system are arranged to enable one face of every LNG liquefaction unit to be directly accessible to the manifold system.

In one embodiment each LNG liquefaction unit has a length Xm, a height Ym, and a width Zm wherein X>Y, and each bank has a length Lm, a height Hm, and a width Wm, where Lm>Wm and wherein in each bank, a length direction of each liquefaction unit is perpendicular to a length direction of the bank.

In one embodiment the LNG production plant comprises one or more cranes configured to construct and de-construct each bank of LNG liquefaction units.

In one embodiment the crane comprises a gantry crane which spans a width of the LNG production plant and is capable of placing an LNG liquefaction unit in a bank or remove an LNG liquefaction unit from a bank.

In one embodiment each containerised LNG liquefaction unit comprises a closed loop refrigerant circuit.

In one embodiment each containerised LNG liquefaction unit comprises an open loop heat transfer fluid circuit arranged to connect to the manifold system enabling heat transfer fluid to flow into and out of each containerised LNG liquefaction unit.

In one embodiment the LNG production plant comprises a cooling facility in fluid communication with the manifold system and arranged to facilitate cooling of the heat transfer fluid.

In one embodiment the cooling facility comprises an air and/or water cooling facility.

In one embodiment each containerised LNG liquefaction unit comprises an LNG liquefaction unit according to the first aspect and its associated embodiments.

In one embodiment the LNG production plant comprising a plurality of LNG liquefaction units according to the first aspect and its associated embodiments and a manifold system arranged to selectively connect, via the connector on each container, one or more of the LNG liquefaction units to: a feed stream gas; an LNG storage facility; and the source of electrical power, wherein the LNG production plant has a maximum production capacity equal to the sum of the production capacity of each of the liquefaction units in the production plant.

In a third aspect there is disclosed a method of producing LNG comprising connecting or disconnecting, to a natural gas feed stream, discrete incremental LNG liquefaction capacity as required to match mass flow rate of the natural gas in the feed stream.

In one embodiment the method comprises connecting the discrete incremental LNG liquefaction capacity in units of between 0.01 MTPA and 0.30 MTPA.

In one embodiment the method comprises providing the discrete incremental LNG liquefaction capacity by way of one or more containerised LNG liquefaction units wherein each containerised LNG liquefaction unit is capable of being connected to the natural gas feed stream to receive at least a portion of the natural gas from the feed stream and producing from the portion of natural gas of a volume of LNG.

In one embodiment the method comprises monitoring operational status each of the containerised LNG liquefaction units to detect a failure of or fault in the units, and upon detection of a failure or fault in a unit, disconnecting or otherwise isolating the unit from the natural gas feed stream.

In one embodiment the method comprises for each containerised LNG liquefaction unit detected as failed or having a fault, connecting a fresh containerised LNG liquefaction unit to the natural gas feed stream.

In one embodiment the method comprises transferring LNG produced by each containerised LNG liquefaction unit to an LNG storage facility.

In one embodiment the method comprises circulating a heat transfer fluid through the containerised LNG liquefaction units connected to the natural gas feed stream and heat transfer fluid heat exchanger.

In one embodiment the method comprises providing the one or more containerised LNG liquefaction units as liquefaction units in accordance with first aspect and its associated embodiments.

In a fourth aspect there is disclosed a method of supplying LNG at a temperature of about −161° C. a pressure of about 1 bar comprising:

- producing, at a fixed location, LNG at a temperature higher than −161° C. and a pressure of greater than one bar;
- transferring the produced LNG to transport vessel having pressurised storage tanks for holding the produced LNG; and while sailing the transport vessel to a destination port chilling the LNG to about −161° and reducing containment pressure of the LNG to about 1 bar.

In one embodiment the method comprises producing the LNG in one or more containerised LNG liquefaction units wherein each containerised LNG liquefaction unit is configured to produce LNG at a temperature higher than −161° C. and a pressure of greater than one bar.

In on embodiment the method comprises producing the LNG at a fixed location comprises producing the LNG accordance with the third aspect and its associated embodiments In a fifth aspect there is disclosed a method of constructing an LNG production plant at a production site comprising: connecting or disconnecting, to a natural gas feed stream, discrete incremental LNG liquefaction capacity as required to match mass flow rate of the natural gas in the natural gas feed stream.

In one embodiment connecting discrete incremental LNG liquefaction capacity comprises transporting to the production site one or more containerised LNG liquefaction units wherein each of the units is capable of producing from the natural gas feed stream the predetermined volume of LNG; and connecting the one or more containerised LNG liquefaction units to the natural gas feed stream.

In one embodiment the method comprises stacking the one or more containerised LNG liquefaction units to form one or more banks of stacked containerised LNG liquefaction units.

In one embodiment the method comprises autonomously stacking the one or more containerised LNG liquefaction units to form the one or more banks.

In one embodiment the method comprises connecting the containerised LNG liquefaction units to a heat transfer fluid circuit arranged to enable a flow of a heat transfer fluid through each of the connected containerised LNG liquefaction units and an external heat exchanger.

In one embodiment the method comprises connecting the one or more containerised LNG liquefaction units connecting a power supply.

In one embodiment the method comprises connecting the one or more containerised LNG liquefaction units to a LNG storage facility.

In one embodiment the method comprises connecting the one or more containerised LNG liquefaction units to a supply of an inert gas.

In one embodiment the method comprises autonomously connecting one or more of the power supply, LNG storage facility, and suppliers in a gas to the one or more containerised LNG liquefaction units.

In one embodiment the method comprises simultaneously connecting the power supply, the heat transfer fluid circuit, and the supply of inert gas to the one or more containerised LNG liquefaction units.

In a sixth aspect there is disclosed a refrigeration system for facilitating liquefaction of natural gas comprising a volume of a single mixed refrigerant (SMR) and a closed loop refrigeration circuit through which the SMR circulates as a plurality of refrigerant streams having at least a first LMR refrigerant stream, a first heat exchanger main refrigerant stream, a subcooled LMR stream and a second heat exchanger main refrigerant stream, the circuit having first and second heat exchangers and at least one compressor for compressing the SMR;

wherein the first heat exchanger is arranged to cool the first LMR refrigerant stream against the first heat exchanger main refrigerant stream to produce the subcooled LMR refrigerant stream;

the second heat exchanger is arranged to cool a natural gas feed stream against the second heat exchanger main refrigerant stream to produce liquefied natural gas wherein the second heat exchanger main refrigerant stream is derived at least in part from the subcooled LMR stream; and wherein at least the first and second heat exchanger main refrigerant streams are circulated by pressure differential alone thought the refrigeration system created by the at least one compressor.

In one embodiment the first heat exchanger is configured so that the first heat exchanger main refrigerant stream flows through the first heat exchanger and vaporises by heat transfer with the first LMR refrigerant stream to produce a first vapour refrigerant stream.

In one embodiment the subcooled LMR stream is split to form a first expanded stream and a second expanded stream and wherein the first heat exchanger main refrigerant stream comprises, at least in part, the first expanded stream and the second heat exchanger main refrigerant stream comprises, at least in part, the second expanded stream.

In one embodiment the plurality of refrigerant streams includes a first HMR refrigerant stream which is cooled against the second heat exchanger main refrigerant stream in the second heat exchanger to produce a subcooled HMR stream.

In one embodiment the subcooled HMR stream is split and expanded to form a third expanded stream and a fourth expanded stream wherein the third expanded stream is combined with the second expanded stream to form the second heat exchanger main refrigerant stream; and the fourth expanded stream is combined with the first expanded stream to form the first heat exchanger main refrigerant stream.

In one embodiment the second heat exchanger main refrigerant stream is vaporised in the second heat exchanger to form a second vapour refrigerant stream.

In one embodiment the refrigeration circuit comprises a first separator which receives the first vapour refrigerant stream and the second vapour refrigerant stream.

In one embodiment at least one compressor comprises a low-pressure compressor, a high pressure compressor and the refrigerant system includes a second separator in fluid communication between the low-pressure compressor and the high pressure compressor and a vapour from the second separator is compressed by the high pressure compressor to form the first LMR refrigerant stream.

In a first embodiment a bottoms liquid from the second separator forms the first HMR refrigerant stream.

In one embodiment the first and second vapour refrigerant streams are compressed by the first compressor.

In a second embodiment the refrigerant system comprises a third separator in fluid communication with the high pressure compressor and wherein a vapour from the third separator form the first LMR stream and bottoms liquid form the third separator forms the first HMR stream.

In a seventh aspect there is disclosed a refrigeration system for facilitating liquefaction of natural gas comprising a volume of a single mixed refrigerant (SMR) and a closed loop refrigeration circuit through which the SMR circulates as a plurality of refrigerant streams having at least a first LMR refrigerant stream, a first heat exchanger main refrigerant stream, a subcooled LMR stream and second heat exchanger main refrigerant stream, the circuit having first and second heat exchangers;

wherein the first heat exchanger is arranged to cool the first LMR refrigerant stream against the first heat exchanger main refrigerant stream to produce the sub-cooled LMR refrigerant stream;

the second heat exchanger is arranged to cool a natural gas feed stream against the second heat exchanger main refrigerant stream to produce liquefied natural gas wherein the second heat exchanger main refrigerant stream is derived at least in part from the subcooled LMR stream; and wherein at least the first LMR refrigerant stream is a mixed phase refrigerant stream.

In one embodiment the first heat exchanger main refrigerant stream is a mixed phase refrigerant stream.

In one embodiment the second heat exchanger main refrigerant stream is a mixed phase refrigerant stream.

In one embodiment the composition of the single mixed refrigerant in the first heat exchanger main refrigerant stream flowing into the first heat exchanger is different to the composition of the single mixed refrigerant in the second heat exchanger main refrigerant stream flowing into the second heat exchanger.

In an eighth aspect there is disclosed a refrigeration system for facilitating liquefaction of natural gas comprising a volume of a single mixed refrigerant (SMR) and a closed loop refrigeration circuit through which the SMR circulates as a plurality of refrigerant streams, the refrigeration circuit having at least one compressor and at least two heat exchangers spaced from each other, wherein a first heat exchanger is arranged to cool the SMR against itself to produce a precooled LMR refrigerant stream, and the second heat exchanger is arranged to cool the natural gas against a second heat exchanger main refrigerant stream sourced in part from the precooled LMR refrigerant stream to produce liquefied natural gas.

In a ninth aspect there is disclosed a refrigeration system for facilitating liquefaction of natural gas comprising a volume of a SMR and a closed loop refrigerant circuit through which the SMR flows, the circuit having two spaced apart heat exchangers, the SMR circulating as a first heat exchanger main refrigerant stream and a first LMR stream provided at separate inlets to the first heat exchanger and a second heat exchanger main refrigerant stream and a first HMR refrigerant stream provided at separate inlets to the second heat exchanger, wherein composition of the SMR refrigerant streams at each of the inlets is different from each other.

In an embodiment of any one of the sixth to ninth aspects one or both first heat exchangers and the second heat exchangers has an aspect ratio of greater than one. (i.e. "horizontal" heat exchangers).

In an embodiment of any one of the sixth to ninth aspects the SMR refrigerant is circulated through the heat exchangers solely by pressure differential created by the compressors.

In a tenth aspect there is disclosed a liquefaction system comprising:

a refrigerant circuit having least a first heat exchanger and a second different heat exchanger;

a volume of a SMR which flows through the circuit and includes a light and a heavy mixed refrigerant fraction;

wherein the first heat exchanger is cooled by a SMR stream having a first proportion of the light and heavy refrigerant fractions and the second heat exchanger is cooled by a SMR stream with a second different proposition of the light and heavy refrigerant fractions.

An example of this arrangement is shown in FIG. 5 where the valve shown in phantom is included.

In one embodiment the proportion of the heavy refrigerant fraction in the SMR stream for either one of the first or the second heat exchangers is zero. This is exemplified by the arrangement in FIG. 5 where the valve shown in phantom is omitted.

In an eleventh aspect there is disclosed a liquefaction system comprising:

a refrigerant circuit having least a first heat exchanger and a second heat exchanger;

a volume of a SMR which flows through the circuit and includes a light and a heavy mixed refrigerant fraction; and a hot stream of fluid divided into at least a first hot stream portion and a second hot stream portion wherein the first hot stream portion is directed to flow through the first heat exchanger, and the second hot stream portion is directed to flow through the second heat exchanger. An example of this arrangement is shown in FIGS. 7 and 8.

In one embodiment hot stream that is divided is the natural gas stream that is being liquefied by the system. This is also exemplified in FIGS. 7 and 8. Additionally in this embodiment the first and second heat exchangers may be different from each other. Throughout this specification except where the context requires otherwise due to express language or necessary implication, the expressions "different heat exchangers" or "different types of exchanger" and variations such as "different exchangers" are intended to include at least the following difference between heat exchangers:

Different number of passes or channels;

Same number of passes or channels but where the exchangers are of different size;

Operating with refrigerant streams at one or any combination of two or more of (a) different pressures; (b) different flow rates; and (c) different compositions In a twelfth aspect there is disclosed a liquefaction system comprising:

a refrigerant circuit having least a first heat exchanger and a second heat exchanger;

a volume of a SMR which flows through the circuit and includes a light and a heavy mixed refrigerant fraction;

wherein the first heat exchanger is cooled by a SMR stream having a first proportion of the light and heavy refrigerant fractions and the second heat exchanger is cooled by a SMR stream with a second different proposition of the light and heavy refrigerant fractions; and a hot stream of fluid is divided into at least a first hot stream portion and a second hot stream portion wherein the first hot stream portion is directed to flow through one of the first and second heat exchangers, and the second hot stream portion is directed to flow through another of the first and second heat exchanger. An example of this arrangement is shown in FIG. 10. Additionally, in one embodiment of this aspect the first and second heat exchangers may be different from each other.

BRIEF DESCRIPTION OF THE DRAWINGS

Notwithstanding any other forms which may fall within the scope of the LNG liquefaction unit and associate method of producing LNG as set forth in the Summary, specific embodiments will now be described, by way of example only, with reference to becoming drawings in which.

DETAILED DESCRIPTION OF SPECIFIC EMBODIMENTS

Figure 1:
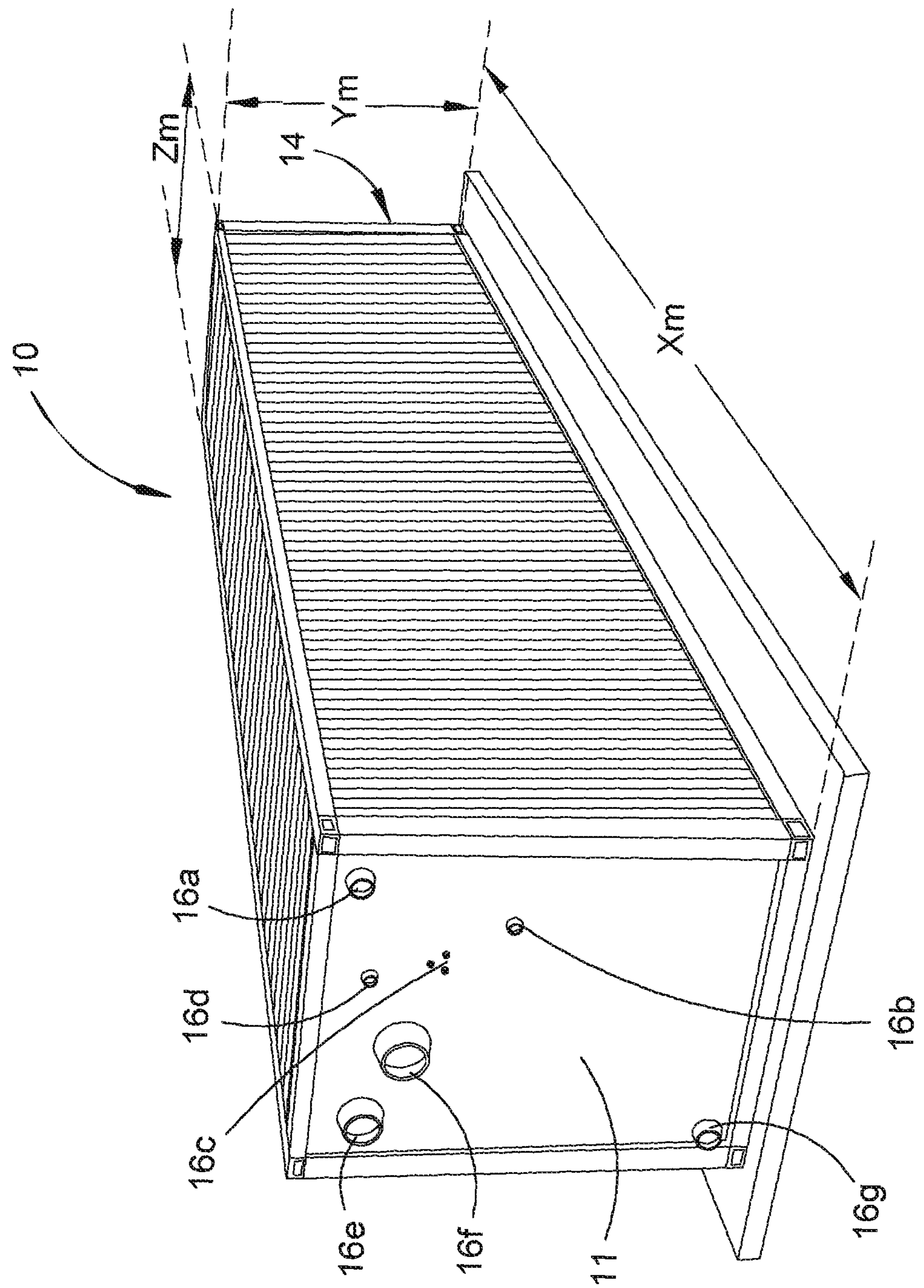
FIG. 1 is a schematic isometric view of one embodiment of the disclosed containerised LNG liquefaction unit.

Referring to the accompanying Figures an embodiment of the containerised LNG liquefaction unit 10 comprises an LNG liquefaction plant 12 (shown in FIGS. 2-4) and a transportable container 14 (shown in FIG. 1). The LNG liquefaction plant 12 is wholly contained within the transportable container 14. In the illustrated embodiment a plurality of connectors 16*a*-16*f* (hereinafter referred to in general as "connectors 16") are supported on the container 14 to enable the separate and mutually isolated flow of services, fluids and utilities into and/or out of the container 14.

Each of the connectors 16 is provided on a common wall 11 of the container 14. The connectors include but are not limited to:

- a feed gas inlet connector 16*a* enabling a feed stream of gas for liquefaction to be fed to the plant 12;
- a LNG outlet connector 16*b* enabling LNG produced by the plant 12 to exit the container 14, for example to flow into a storage tank;
- a power connector 16*c* providing electrical power to the equipment forming the plant 12;
- an inert gas inlet connector 16*d*, enabling an inert gas such as but not limited to nitrogen gas to flow into the container 14 to provide an inert environment and/or for operating instrumentation and controls;
- a heat transfer fluid inlet connector 16*e* to enable a heat transfer fluid such as water to be provided to one or more intercoolers or the other heat exchanger within the container 14;
- a heat transfer fluid outlet connector 16*f* to enable the heat transfer fluid to pass out of the container 14 for example to a heat rejection plant and for possible recirculating to the heat transfer fluid inlet 16*e*, thereby enabling heat energy to be removed from the container 14;
- a drain connector 16*g* to enable removal of unwanted liquids from the container 14 for commissioning the unit 10, de-commissioning the unit prior to maintenance and/or used for emergency response, e.g. blowdown of hydrocarbons;
- a vent 16*h* for the removal of unwanted vapours or release of hydrocarbons;
- a kill port connector (not shown) enabling the injection of a gas, liquid or slurry for the purposes of fully shutting down and rendering harmless the LNG plant 12.

The container 14 may be hermetically sealed to prevent uncontrolled flow of fluid into and out of the container 14. Further, the container 14 may be provided with a positive pressure relative to the outside environment It may be advantageous but not essential that the container 14 is in the general shape and configuration, and moreover has an exterior size and shape, of an ISO container.

ISO containers come in a wide range of standard dimensions are handled all over the world at shipping ports as well as on rail and road transport vehicles. Accordingly, the infrastructure for the transportation and movement of such containers is readily available and easily replicated. ISO containers are available in standard lengths from 10 foot up to 53 foot (about 3 m to 16 m). For most standard lengths there is also a range of container sizes varying in width or height. Some embodiments of the disclosed containerised LNG liquefaction unit 10 are arranged to fit within a standard ISO 40 foot (12 m) container. A standard ISO container while of suitable dimensions is likely to require structural reinforcement and strengthening to accommodate the weight of the liquefaction unit. By way of comparison standard ISO 40 foot container has a rated maximum capacity of about 30 tonnes whereas the weight of the liquefaction unit 12 is likely to be in the order of 80-90 tonnes.

Figure 2:
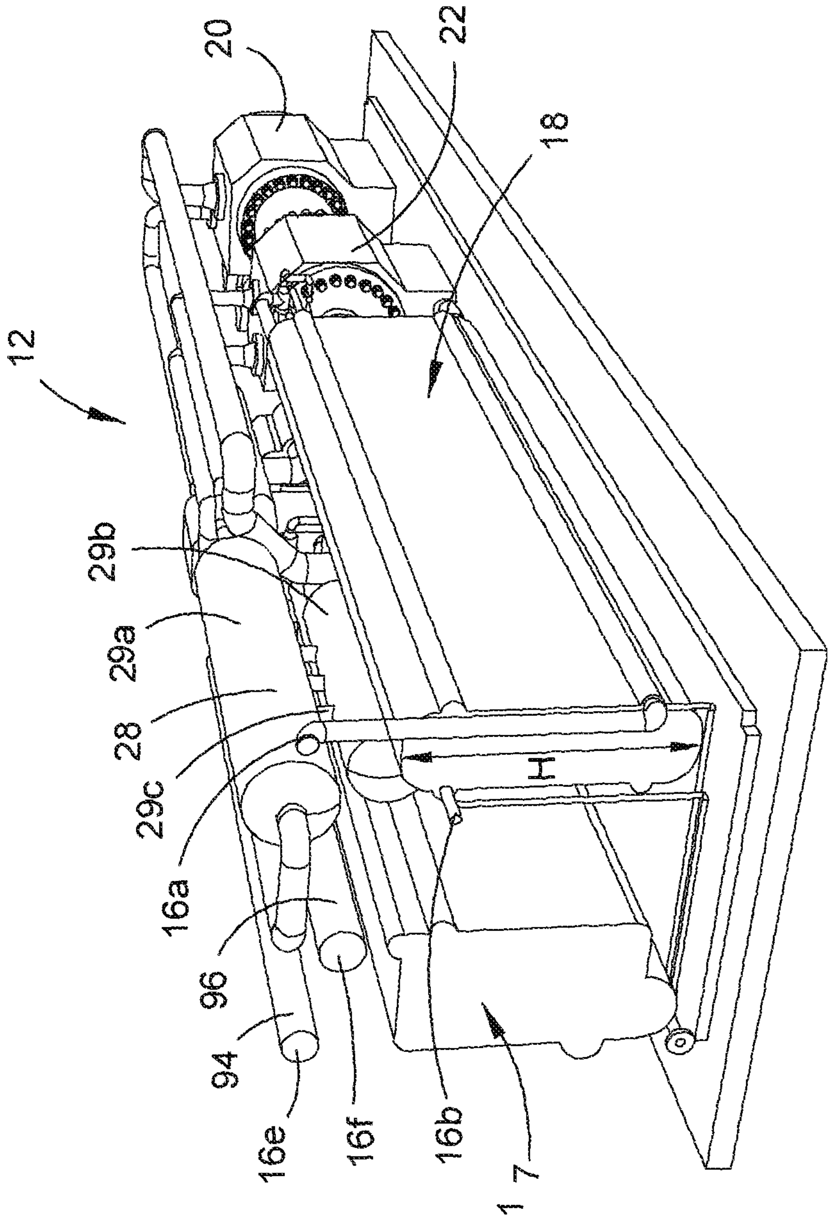
FIG. 2 is an isometric view from one angle of plant and equipment of the containerised LNG liquefaction unit shown FIG. 1.
Figure 3:
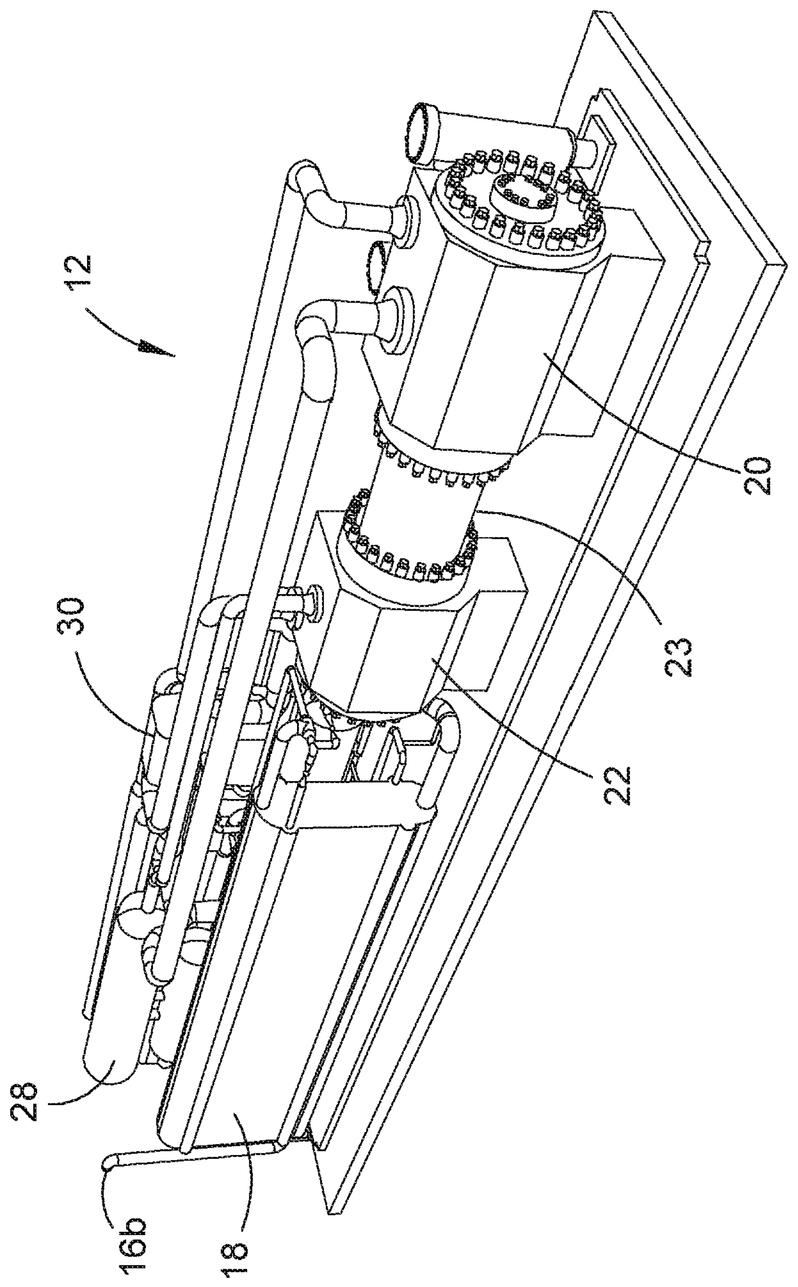
FIG. 3 is an isometric view from a second angle of the plant and equipment shown in FIG. 2.
Figure 4:
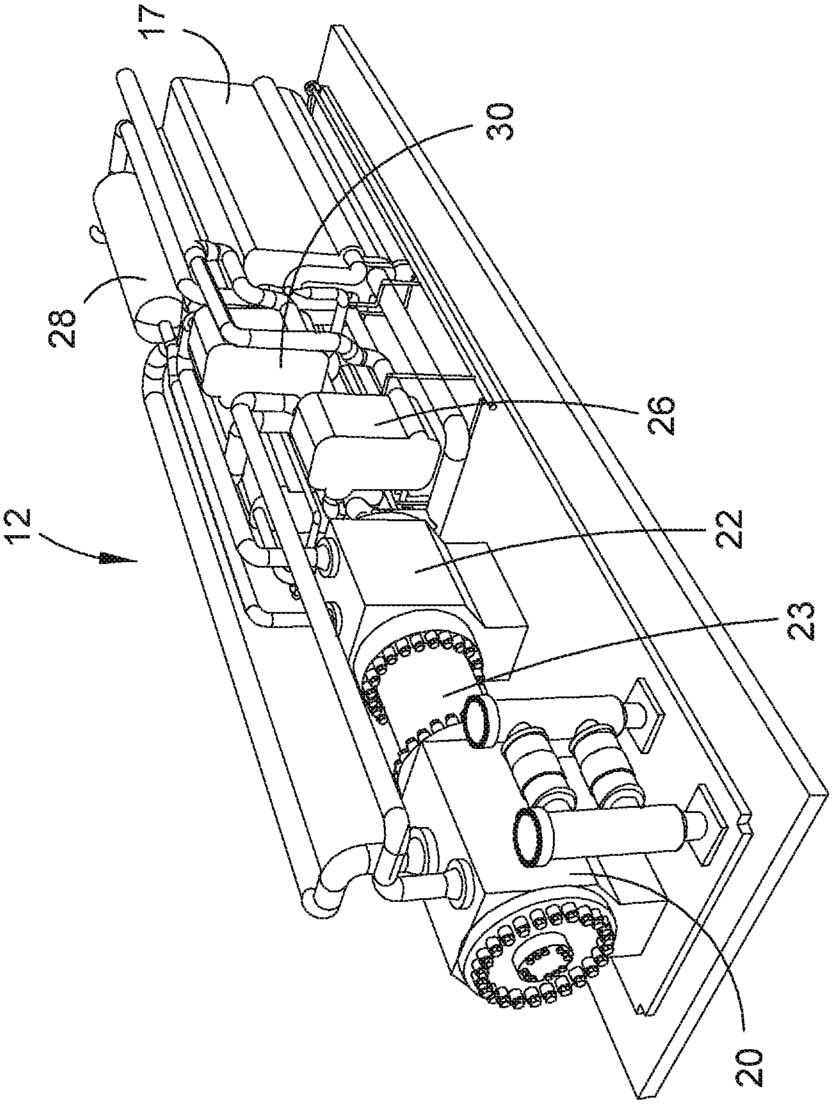
FIG. 4 is an isometric view from a third angle of the plant and equipment shown in FIG. 2.

Referring now specifically referring to FIGS. 2-4 the liquefaction unit 12 utilises a single mixed refrigerant (SMR) process. The liquefaction unit 12 uses a main cryogenic heat exchanger (MCHE) whose duty cycle is split across two separate, and in this instance different, cryogenic heat exchangers 17 and 18. (The being that the heat exchanger 17 as two passes all channels whereas the heat exchanger 18 has three.) As will be explained in greater detail later the heat exchanger 17 provides precooling of the refrigerant whereas the heat exchanger 18 effects liquefaction of the natural gas feed.

The heat exchangers 17 and 18 may be of various types including but not limited to plate heat exchangers or 3D printed heat exchangers. Irrespective of the technology used in the present embodiment the heat exchangers have an aspect ratio of meaning that their length L is greater than their height H. This is the exact opposite to conventional MCHEs where the height dimension is greater than its length/width dimension. Additionally, the heat exchangers 17 and 18 are required to handle a thermal stress in the order of at least 90°-100° C./m of height. For example, in one embodiment of a SMR circuit shown in FIG. 5, the heat exchanger 17 has a LMR inlet feed at the ambient temperature (e.g. about 25° C.) and an expanded main refrigerant feed of around −159° C., with a heat exchanger itself having a height dimension H of less than about 2 m. The heat exchanger 17 requires a minimum of two channels while the exchanger 18 requires a minimum of three channels.

The liquefaction unit 12 is provided with a low-pressure compressor 20 and a high-pressure compressor 22. The compressors 20, 22 are driven by a common electric drive 23. The compressors 20, and 22 are hermetically sealed. Vapour phase refrigerant is supplied to the inlet of the low-pressure compressor 20 via a separator 24. The low-pressure compressor 20 compresses the vapour to around 15 bar and a temperature of around 100° C. The compressed refrigerant is passed through an intercooler 26 (where cooling is provided by heat exchange with a water flow) reducing the temperature of the compressed refrigerant to around 25° C.

The compressed refrigerant is fed to a separator 28. The separator 28 is in a horizontal disposition rather than the common vertical disposition. To provide more distinct separation between vapour and liquid phases within the separator 28, owing to its horizontal disposition, separator 28 comprises a vapour vessel 29*a* (see FIG. 2), and a liquid vessel 29*b* which are in fluid communication with each other via a manifold 29*c*.

The vapour phase from the separator 28 is fed to the inlet of the high-pressure compressor 22 from the vapour vessel 29*a*. The compressor 22 compresses the refrigerant which is cooled by flow through an aftercooler 30 (which also provides cooling by heat exchange with a water flow) to about 25° C. and supplied as a dual phase light mixed refrigerant (LMR) via a conduit 32 to an inlet 34 of the heat exchanger 17. The liquid phase from the separator 28 is supplied via liquid vessel 29*b* and conduit 36 as a heavy mixed refrigerant (HMR) to an inlet 38 of the second heat exchanger 18.

The LMR provided at the inlet 34 is cooled in the heat exchanger 17 against a first heat exchanger main refrigerant stream provided via conduit 40 to inlet 42 of heat exchanger 17. The LMR is cooled and exits the heat exchanger 16 via a conduit 44 where it is fed to a splitter 46. The splitter 46 splits the cooled LMR into: a first stream which flows through conduit 52 to a first expansion valve 52; and, a second stream which flows through conduit 54 to a second expansion valve 56. The flow rate between the first and second streams in this embodiment is not the same but rather is on a ratio of about 1.5:1 (i.e. the flow rate through the conduit 50 is about 1.5 times that flowing through the conduit 54).

The HMR provided at the inlet 38 is cooled in the second heat exchanger 18 against a second heat exchanger main refrigerant stream provided by a conduit 58 to an inlet 60. The HMR is cooled and exits the heat exchanger 18 via a conduit 62 and flows to a splitter 64. The splitter 64 splits the cooled HMR into a first stream which flows through a conduit to a third expansion valve 68 and a second stream which flows through a conduit to a fourth expansion valve 72. The flow rate between the streams passing through conduit 66 and 70 is on a ratio of about 1:13 (i.e. the flow rate to the expansion valve 72 is 13 times that of the flow rate to the expansion valve 68).

The expansion valve 52 provides a first expanded refrigerant flow through conduit 74. The expansion valve 56 provides a second expanded refrigerant flow through conduit 76. The third expansion valve 68 provides a third expanded refrigerant flow through conduit 78. The fourth expansion valve 72 provides a fourth expanded refrigerant flow through conduit 80. The first heat exchanger main refrigerant stream flowing through the conduit 40 to the inlet 42 is a combination of the first and fourth expanded refrigerant streams provided via conduits 74 and 80. The second heat exchanger main refrigerant stream flowing through conduit 58 to the inlet 60 comprises the combination of the second and third expanded refrigerant flow is provided via conduits 76 and 78 respectively.

The relative mass flow rates between the first and second heat exchanger main refrigerant flows is around 2:1 (i.e. the flow mass rate into the inlet 42 is about twice that of the mass flow rate at the inlet 60).

Evaporated refrigerant leaves the first heat exchanger 17 via outlet 63 and flows through conduit 65 to the first separator 24. Evaporated refrigerant leaves the second heat exchanger 18 via outlet 67 and flows through conduit 69 and then conduit 65 to the first separator 24.

A natural gas feed stream is provided by the connector 16*a* to an inlet 82 of the second heat exchanger 18 at a temperature of about 25° C. and pressure of about 80 bar. The natural gas feed stream is liquefied within the heat exchanger 18 and exits as LNG at an outlet 84 at a temperature of about −157° C. and pressure of around 78 bar. The LNG flows through conduit 86 to expansion valve 88 wherein it is cooled to a temperature of between about −161° C. to −162° C. and depressurised to one bar then subsequently fed to the connector 16*b*. A conduit 90 connected to the connector 16*b* feeds the LNG to an LNG storage tank 92 which is outside of and remote from the container 14. In a minor variation of this arrangement the valve 88 may be outside of the container 14.

While the liquefaction unit 10 utilises a single mixed refrigerant the composition of the refrigerant in each of the heat exchangers 17, 18 is different. This arises because the LMR and HMR provided at the inlet 34 and 38 respectively have components of the refrigerant in different proportions in vapour and liquid phases. The LMR provided at the inlet 34 has refrigerant in both liquid and vapour phases where the HMR is provided at the inlet 38 in a liquid phase only.

Figure 5:
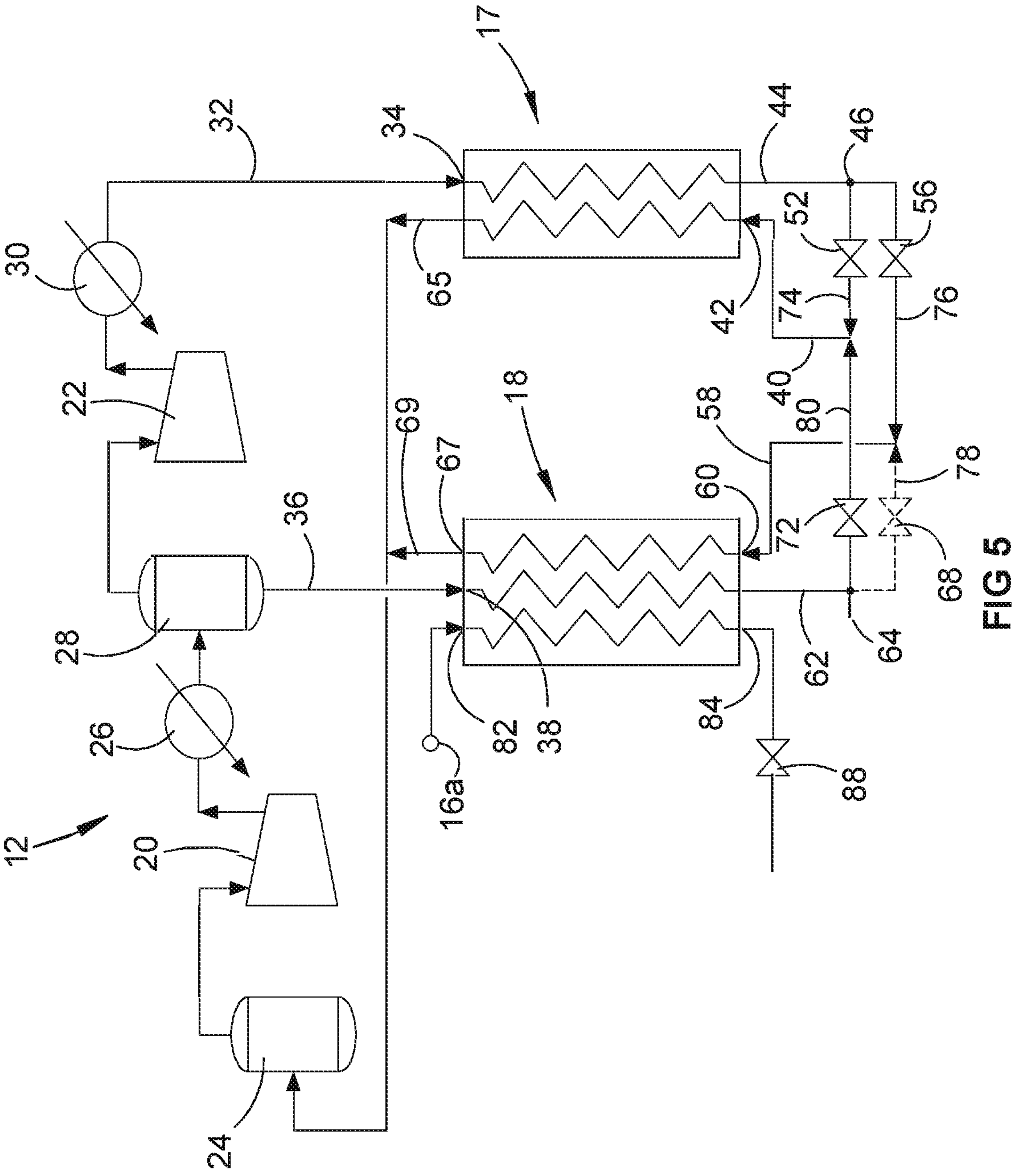
FIG. 5 is a flow diagram of one embodiment of the LNG liquefaction unit.

In the embodiment of the plant 12 shown in FIG. 5 the expansion valve 68 is shown in phantom line to indicate that this is an optional valve. When this valve is included there is then to valve's feeding each of the heat exchangers 17, 18 so that both can receive a mixture of two refrigerant fractions (i.e. LMR and HMR). Where the ideal refrigerant composition for one exchanger is 100% of the lighter fraction, then the valve 68 can be omitted for simplicity.

FIG. 2 also illustrates a conduit 94 which provides heat exchanger fluid in the form of water to the intercooler 26 and after cooler 30. The conduit 94 is in fluid communication with the connector 16*e*. A conduit 96 feeds the spent heat exchanger fluid from the coolers 26 and 32 to the connector 16*f*.

In the present embodiment motor 23 is a single motor having coaxial drive shafts at opposite ends for driving the compressor is 20 and 22. Ideally the compressors 20 and 22 are arranged to be driven at the same speed thereby avoiding the need for one or more gearboxes. However, embodiments where the compressors are driven at different speeds by the same motor via the use of gearboxes are also contemplated. Indeed, as discussed later below is also possible for the compressors 20 and 22 to be driven by different motors.

Each unit 10 is provided with a monitoring system (not shown) capable of monitoring status and performance of the LNG liquefaction plant 12 and providing remotely accessible status and performance information pertaining to the liquefaction unit. The monitoring system may further monitor environmental characteristics within the container. The environmental characteristics include one or more of, but are not limited to: pressure of the atmosphere within the container 14; composition of the atmosphere in the container 14; atmospheric temperature within the container 14; and temperature of one or more selected components of the LNG production plant.

Figure 6:
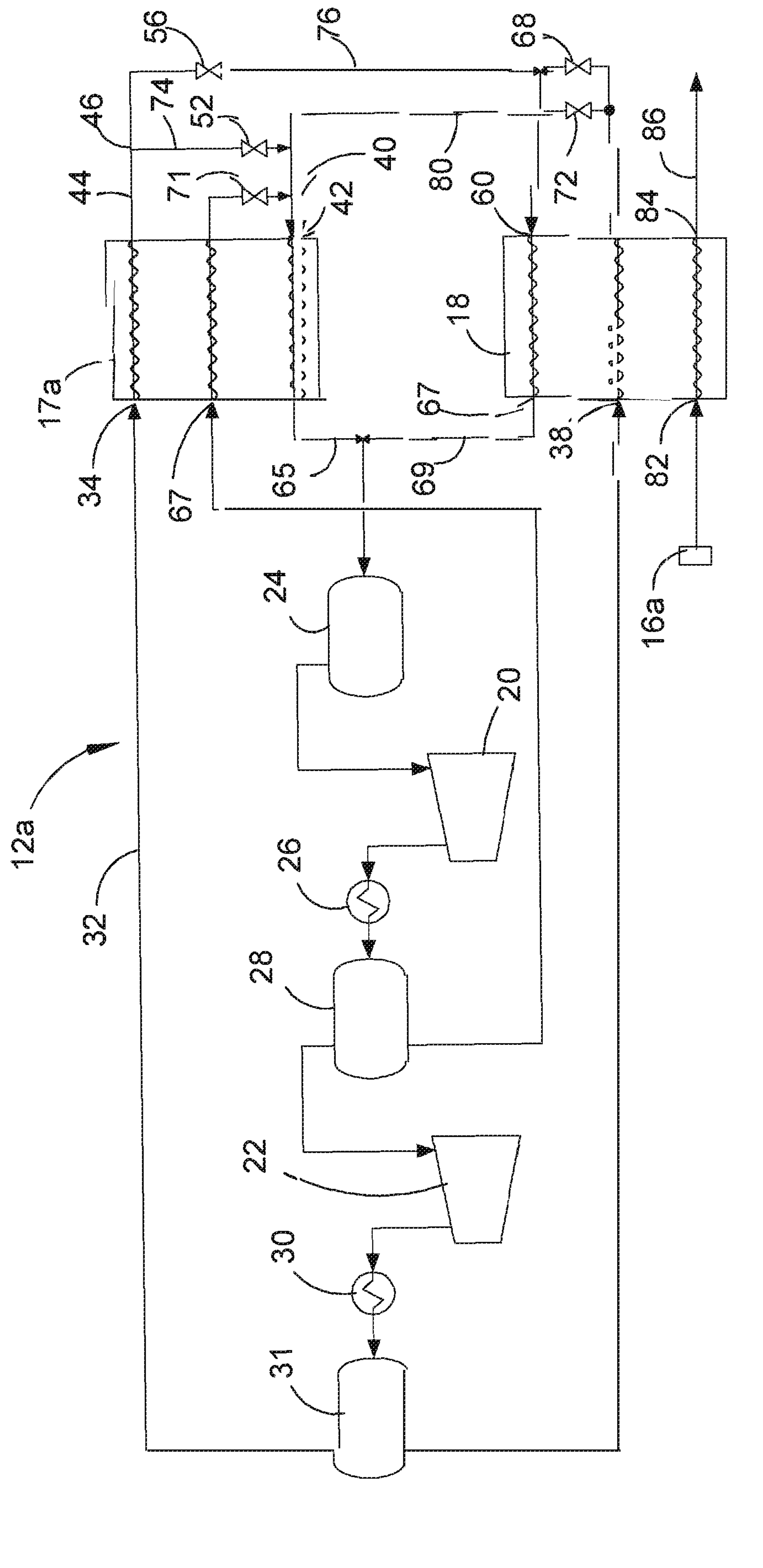
FIG. 6 is a flow diagram of a second embodiment of the LNG liquefaction unit.

FIG. 6 shows an embodiment of the SMR circuit for an alternate liquefaction plant 12*a*. In FIG. 6 the same reference numerals are used as for FIG. 5 to denote the same features. The main differences between the liquefaction plants 12 and 12*a* are:

- The use of a three channel heat exchanger 17*a* in the plant 12*a* in comparison to the two channel heat exchangers 17 of plant 12. Thus, in this embodiment of the plant 12*a* has to similar heat exchangers.
- Incorporation of a third separator 31 in the plant 12*a* in series connection with the high-pressure compressor 22 and the water cooler 30.
- Providing the bottoms liquid from the separator 28 as a second HMR stream which is provided to an inlet 73 of the heat exchanger 17*a.*
- An expansion valve 71 which receives and expands the cooled second HMR refrigerant stream from the heat exchanger 17*a*, and adds this to the first heat exchanger main refrigerant stream flowing in conduit 40 to the inlet 42.

Vapour from the separator 31 constitutes the light mixed refrigerant (LMR) which is fed via a conduit 32 to inlet 34 of the heat exchanger 17*a*. The bottoms liquid from the separator 31 provides the first HMR refrigerant stream which is fed to the inlet 38 of the second heat exchanger 18. This is cooled in the second heat exchanger 18 against a second heat exchanger main refrigerant stream provided by a conduit 58 to the inlet 60 to produce a subcooled first HMR stream.

In both liquefaction plants 12 and 12*a* the refrigerant is circulated solely by pressure differential generated by the compressors 20, 22. No pump is required in the plants 12, 12*a* or corresponding units 10 for circulating of the refrigerant.

Figure 7:
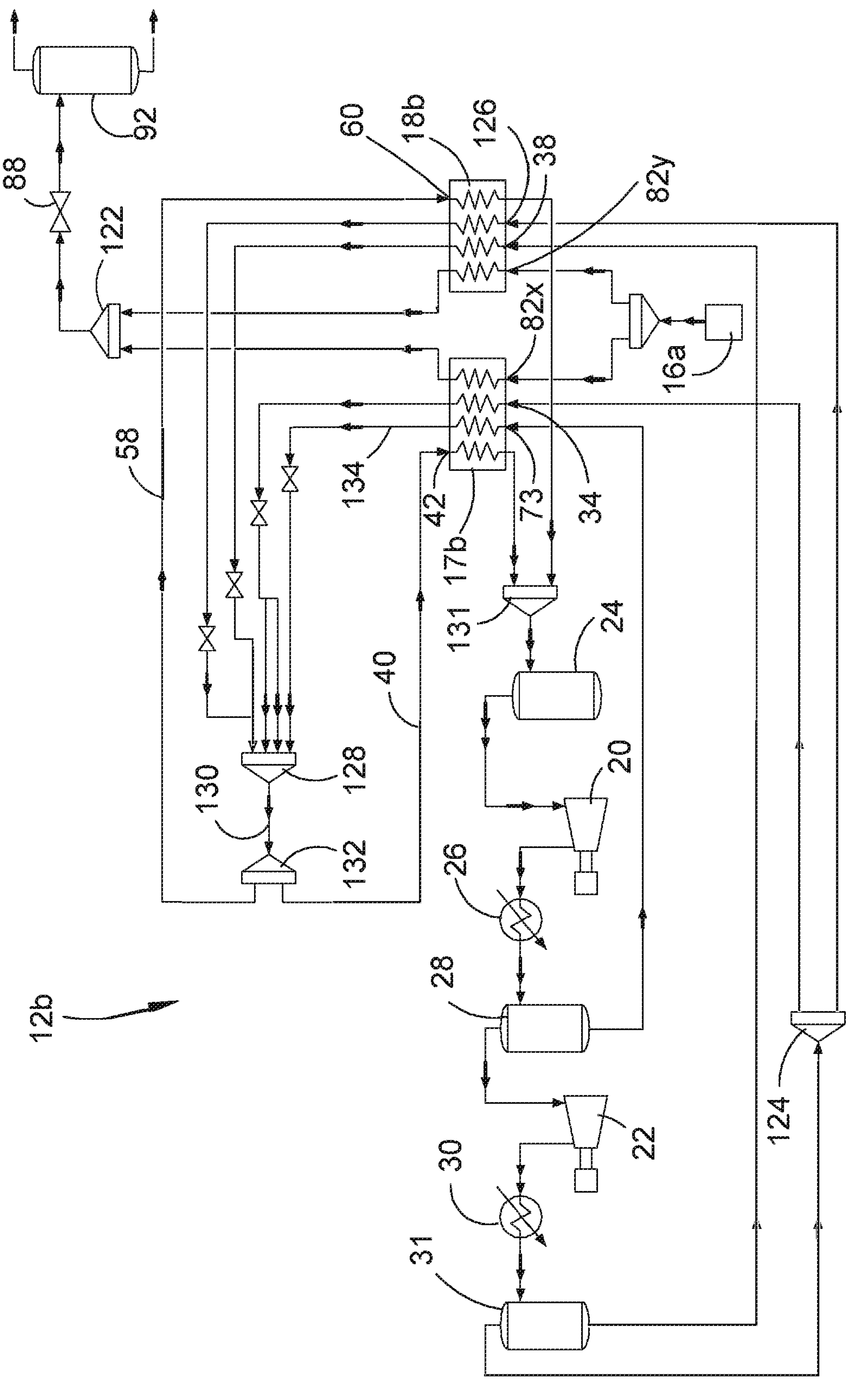
FIG. 7 is a flow diagram of a third embodiment of the LNG liquefaction unit.

FIG. 7 shows an embodiment of the SMR circuit for an alternate liquefaction plant 12*b*. In FIG. 7 the same reference numerals are used as for FIG. 6 to denote the same features. The main differences between the liquefaction plants 12*a* and 12*b* are:

- The plant 12*b* has two four channel (or four pass) heat exchangers 17*b* and 18*b*.
- At least one hot feed stream, in this drawing the natural gas stream provided at the connector 16*a* is divided at splitter 120 and feed to both heat exchangers 17*b* and 18*b* to the inlets 82*x* and 82*y* respectively. This division can be controlled including dynamically controlled the splitter or additional valves to different heat exchangers.
- The natural gas feeds are liquefied by passing through the heat exchangers 17*b*, 18*b* and combined at a mixer 122, there after passing through expander 88 and into the storage facility 92.
- The proportion of the split to feed to natural gas to heat exchangers 17*a* and 17*b* can be varied (including dynamically varied) to control the duty and shape of the composite curve for each of the heat exchangers 17*a*, 17*b*.
- HMR from separator 28 is fed to inlet 73 of heat exchanger 17*b*, and HMR from separator 31 is fed to the inlet 38 of the heat exchanger 18*b* (as in the liquefaction unit 12*a*).
- The LMR are from the separator 31 is divided at splitter 124 and fed to the inlet 34 of heat exchanger 17*b* and the inlet 126 of heat exchanger 18*b*.
- The LMR and HMR passing through the heat exchangers 17*b* and 18*b* are combined at a mixer 128 to produce SMR which flows through conduit 130 and is subsequently divided at splitter 132 into a first SMR stream flowing through conduit 40 to the inlet 42 of heat exchanger 17*b*, and a second SMR stream flowing through conduit 58 to the inlet 60 of the heat exchanger 18*b*.
- The respective SMR streams are then combined at a mixer 131 and fed to the separator 24 for compression of the low-pressure compressor 20 and high-pressure compressor 22.
- It is possible with this arrangement for the heat exchangers 17*b* and 18*b* to be physically different from each other.

A possible modification of the liquefaction unit 12*b* shown FIG. 7 is to provide a second mixer in parallel with the mixer 128 is also fed with the LMR and HMR from the heat exchangers 17*b* and 18*b* by valve controlled splitters. For example, a valve controlled splitter can be replaced in the conduit 134 to enable the HMR from the heat exchanger 17*b* to be provided in a user controlled ratio to the mixer 128 and the second mixer (not shown). This can be done for each of the LMR/HMR lines from the heat exchangers 17*b*, 18*b*. The mixer 128 can be arranged to feed and MR through conduit 58 to the heat exchanger 18*b*, while the second mixer can feed MR through the conduit 40 to the exchanger 17*b*. Now the MR fed to the heat exchangers 17*b* and 18*b* (in particular the ratio of LMR/HMR in each MR feed) can be varied. This includes having zero HMR in one of the "MR" feed stream.

The significance of this is that it facilitates the use of heat exchangers of different characteristics (i.e. when multiple heat exchangers are used it is not a requirement for all to be identical). Possible benefits of the use of two non-identical or different heat exchangers benefit of this of using at least two heat exchangers is explained below.

For efficiency in refrigeration processes, as persons skilled in the art would recognise, the refrigerant heat release curve should match that of the streams to be cooled down, with a small offset to provide the temperature driving force.

The traditional approach for making LNG is to use multi-steam heat exchangers, with multiple hot streams being cooled down by a single refrigerant stream.

The composition and conditions of the refrigerant stream are deliberately chosen to produce a temperature profile to match that of the combined composite curve of the multiple hot streams. The multiple hot streams include both the natural gas and the high pressure refrigerant itself.

In situations where the required throughput exceeds what can be constructed in a single heat exchanger, multiple identical heat exchangers are typically used. For example, two parallel coil-wound heat exchangers. To ensure the correct flows through each heat exchanger, it is customary to use symmetrical piping. This ensures that the flow path through one heat exchanger is more restricted than the parallel path through the other. In some cases, balancing valves may also be employed as a backup measure to bias the flow to account for manufacturing tolerances.

In the case of plate-fin heat exchangers where multiple identical (or mirror-imaged) cores (e.g. 4-10 cores) are used, large diameter headers are used to ensure that the pressure drop through each core is practically identical.

In both cases the use of identical cores means that every service needs to be piped to each individual heat exchanger section. This leads to a restrictive and expensive piping design, and more complication of the heat exchangers themselves.

An alternative is to cool down each of the hot streams down in multiple, non-identical heat exchangers. This can reduce the number of connections to the multiple heat exchangers and also remove the need for symmetrical piping.

The downside of using non-identical heat exchangers is that each will have a different composite curve for the streams to be cooled by the refrigerant. Thus, the refrigerant cooling curve will not be fully optimised. The above described modified form of the present embodiment (i.e. with the second mixer) aims to overcome this concern in two different ways. Firstly, the refrigerant composition used in each heat exchanger 17*b*, 18*b* may be adjusted independently for each heat exchanger. This composition change alters the heating curve of the cold refrigerant in each exchanger, allowing it to better match the hot composite curve in each section. Secondly splitting one of the hot streams and passing it through more than one heat exchanger, both the duty and the shape of the composite curve may be adjusted. Thus, it is possible to adjust the shape of the hot composite curves in order to make them as similar as possible. This allows a single refrigerant composition to be used to cool both heat exchangers without compromising the efficiency.

Finally, the combination of the two approaches can be used—splitting at least one of the hot streams to create hot composite curves in each exchanger that are as similar as possible and furthermore adjusting the composition of refrigerant supplied to each heat exchanger to match the temperature profile in each heat exchanger. In the example shown in FIG. 7 the split of natural gas natural gas stream (which may constitute a "hot stream") fed to the heat exchangers 17*b* and 18*b* may be varied for this purpose. It will also be understood that the HMR (also constituting a "hot stream") fed to the respective heat exchangers 17*b* and 18*b* will be different at least in terms of pressure and temperature from each other. Finally, the split ratio of LMR fed to the respective heat exchangers 17*b* and 18*b* may also be varied at the splitter 124 for example by the use of valves.

In order to adjust the composition of the refrigerant, the ratio of the flows between "heavy" and "light" refrigerant fractions may be adjusted. This the average molecular weight of the mixed refrigerant can be controlled, both in the design phase and dynamically in operation.

Therefore, in summary the embodiment of the liquefaction plant 12 shown in FIG. 7 enables the heat exchangers 17*b*, 18*b* (be they identical or deliberately different) to be cooled by SMR streams of different composition.

Figure 8:
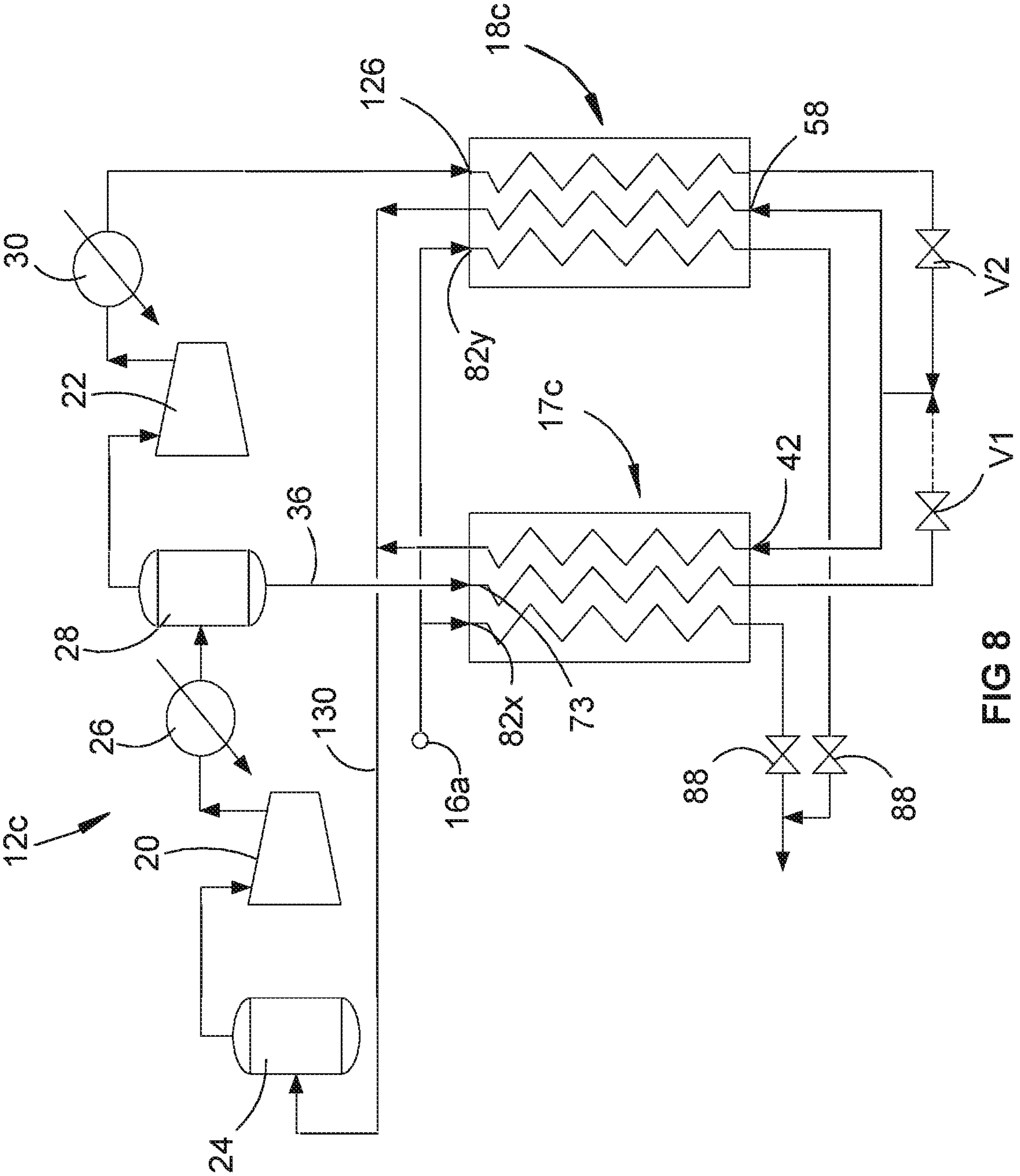
FIG. 8 is a flow diagram of a fourth embodiment of the LNG liquefaction unit.

FIG. 8 illustrates a liquefaction plant 12*c* which is a simplified form of the plant 12*b* shown in FIG. 7. The simplification is brought about by the deletion of the discharge separator 31 and consequentially the ability to replace the two four pass exchangers with two three pass exchangers 17*c* and 18*c*. As in the plant 12*b*, the plant 12*c* provides the ability to split (unevenly in this case) the natural gas between two heat exchangers 17*c*, 18*c*, to enable substantially the same hot-side cooling curve in both exchangers. Therefore, the same composition of refrigerant can be sent to both heat exchangers with minimal loss of efficiency.

The bottoms liquid from the separator 28 constitutes HMR that is passed through the heat exchanger 17*c* and subsequently expanded by passing through valve V1. The compressed refrigerant after passing through high pressure compressor 22 and cooler 30 is fed to exchanger 18*c* and subsequently expanded through the valve V2. The expanded refrigerants from valves V1 and V2 are combined to form the first and second mixed refrigerant feeds to the inlet 42 and 58 of the heat exchangers 17*c* and 18*c*.

Unlike the arrangement in the plant 12 of FIG. 5, the proportion of the refrigerant which passes through each example is not variable in operation. The cold refrigerant flows will balance based upon the pressure drop through each path. The ability to control the natural gas flows through each exchanger, enables compensation and ensures both exchangers can share the load.

Figure 9:
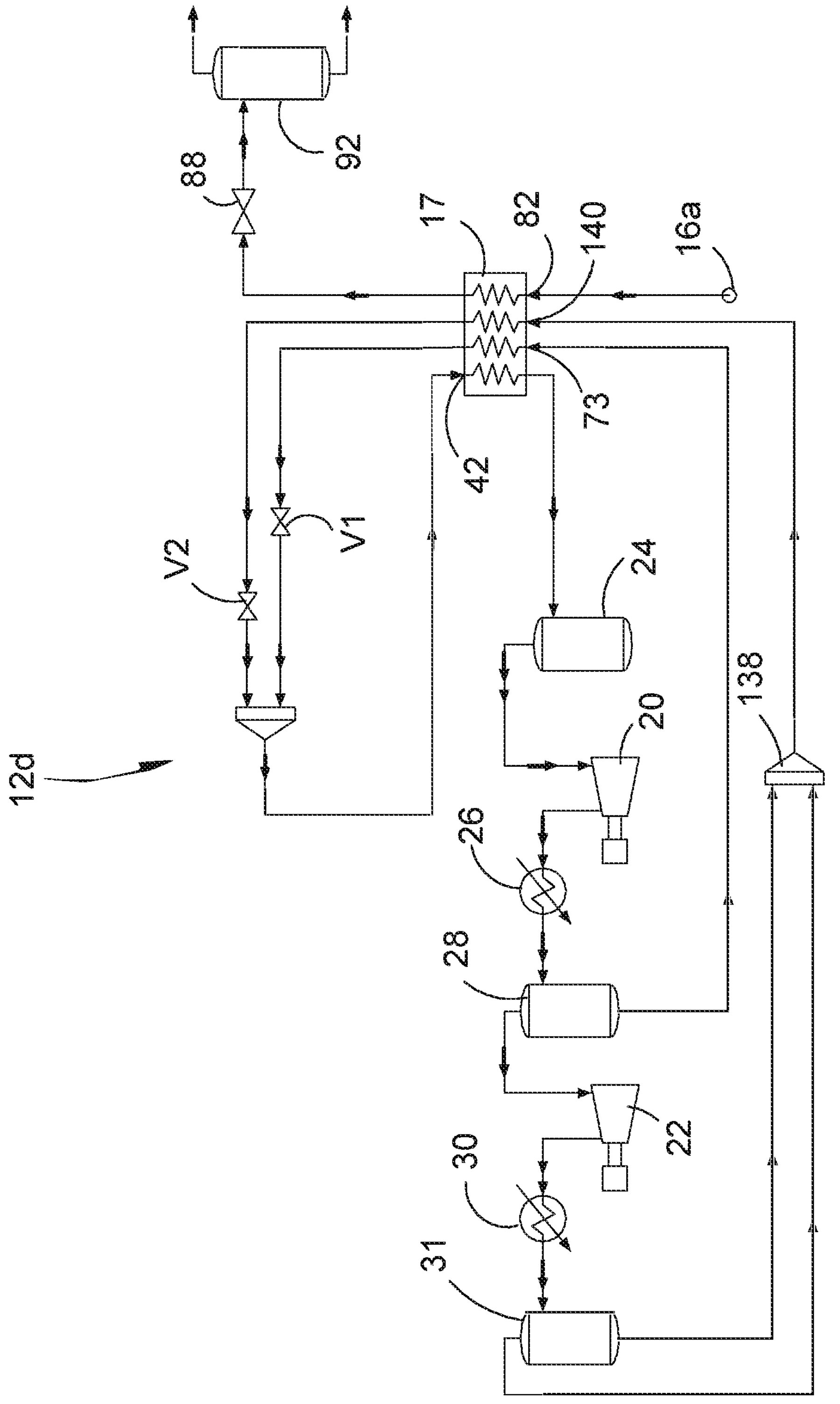
FIG. 9 is a flow diagram of a fifth embodiment of the LNG liquefaction unit.

While the liquefaction plants 12, 12*a*, 12*b*, and 12*c* are each shown as having two heat exchangers. However, embodiments are possible for incorporation in the unit 10 which have a single heat exchanger. One such example is the liquefaction unit 12*d* shown in FIG. 9. In FIG. 9 the same reference numerals are used as for FIG. 6 to denote the same features. The substantive differences between the liquefaction plant 12*d* and plant 12*a*, or significant features of the liquefaction plant 12*d* are summarised as follows:

- The plant 12*c* has a single four pass heat exchanger 17.
- The MR compression circuit for the plant 12*d* is the same as that for plant 12*a*, having an initial separator 24, low pressure compressor 20, intercooler 26, second separator 28, high pressure compressor 22, intercooler 30 and a final separator 31.
- Bottoms liquid from the separator 28 constitutes a HMR stream fed to an inlet 73 of the heat exchanger 17.
- The overhead vapour and bottoms liquid from the separator 31 are combined in a mixer 138 and fed is a mixed phase feed to an inlet 140 to the heat exchanger 17.
- The HMR after passing through the exchanger 17 and expanded through a valve V1. While the mixed phase feed after passing through heat exchanger 17 is expanded through valve V2.
- The flows from valves V1 and V2 form a mixed phase mixed refrigerant fed to the inlet 42 providing the cooling to the natural gas as well as precooling for the streams flowing through the exchanger 17.

Figure 10:
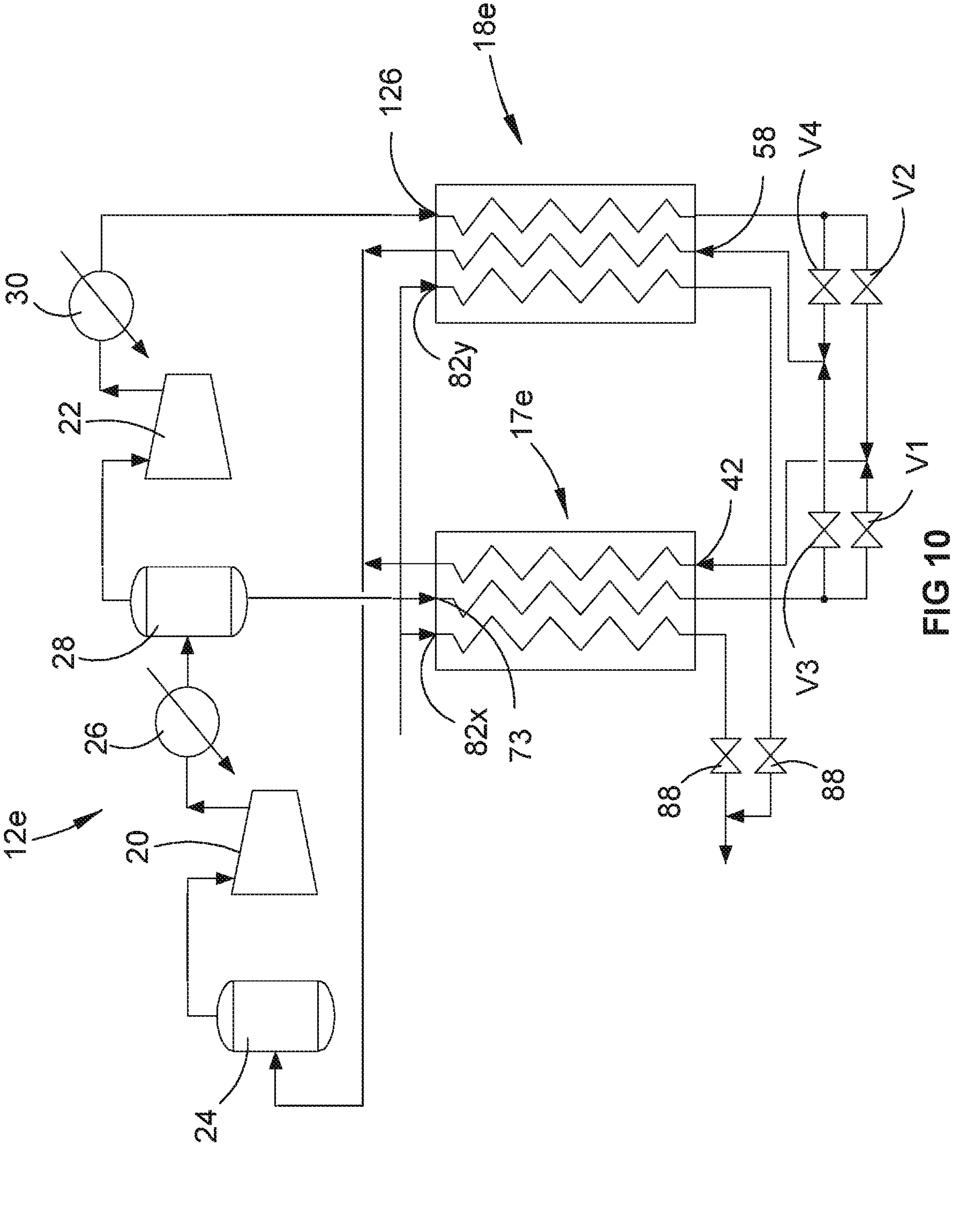
FIG. 10 is a flow diagram of a sixth embodiment of the LNG liquefaction unit.

FIG. 10 shows yet another embodiment of the liquefaction plant 12*e* in which both a hot stream (the natural gas stream) is split to both heat exchangers 17*e*, 18*e* to even out the composite curve shape and both heat exchangers receive mixed refrigerant streams having both heavy and light fractions.

Specifically, in the plant 12*e* the natural gas feed provided at the connector 16*a* is split into two streams flowing to inlets 82*x* and 82*y* of the respective heat exchangers. In addition, the heavy mixed refrigerant from the separator 28 after passing through the heat exchanger 17*e* is split into two streams and flows through the valves V1 and V3. The LMR from the compressor 22 and cooler 30 after passing through exchanger 18*e* is split into two streams and flows through the valves V2 and V4. The heavy and light refrigerant streams from the valves V1 and V2 are combined to form a first mixed refrigerant stream that is fed to the inlet 42 of heat exchanger 17*e*. Similarly, the heavy and light refrigerant streams from valves V3 and V4 are combined to form a second mixed refrigerant stream that is fed to the inlet 52 of the heat exchanger 18*e*.

As previously mentioned the natural gas passes through both heat exchangers to give a very similar shape to the hot-side composite curves. However, this is not perfect, since the dissimilar streams of refrigerant that has to be cooled will never completely match.

In this embodiment, additional efficiency can be gained by fine-tuning the refrigerant composition that is supplied to each heat exchanger. This aids the optimisation across a range of conditions when the proportions of the heavy and light refrigerant flows are changed.

Overall this is slightly more complicated than the plant 12*c* shown in FIG. 8 and the plant 12 shown in FIG. 5 but it provides improved efficiency and flexibility.

It should also be noted that the heat exchangers 17*e* and 18*e* are depicted as identical in size and configuration. They both have three streams, two of which are the same—both natural gas and cold refrigerant pass through both. However, they are different to each other. Specifically, there is a major difference in the third streams that passes through each. The third channel of exchanger 18*e* has a flow of high pressure refrigerant form the compressor 22 that enters as a two-phase mixture that is condensed to become fully liquefied. The exchanger 17*e* as an intermediate pressure refrigerant with a higher molecular weight which enters as liquid form the separator 28 and is subcooled. However, the biggest difference is the relative size of each. The mass flow of the former stream is in fact about 10 times as much as the liquid only stream. As a result, the relative size/duty of the 18*e* exchanger will be much bigger (>5 times) than the exchanger 17*e*.

This is an example of the meaning "different exchangers" or "non-identical exchangers". The difference can be manifested for example by

- Different number of passes or channels;
- Same number of passes or channels but where the exchangers are of different size;
- Operating with refrigerant streams at one or any combination of two or more of (a) different pressures; (b) different flow rates; and (c) different compositions.

Figure 11:
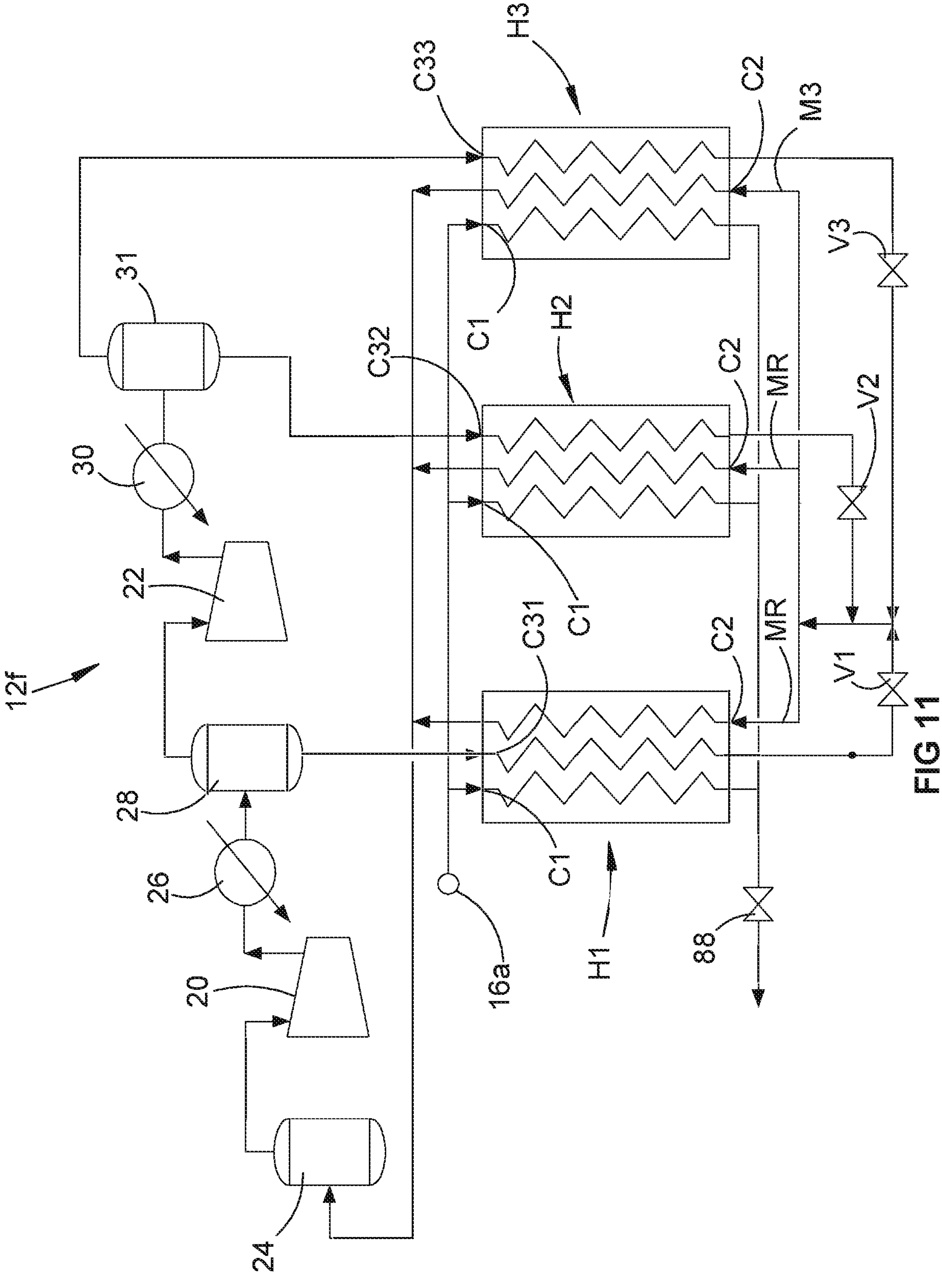
FIG. 11 is a flow diagram of a seventh embodiment of the LNG liquefaction unit.

FIG. 11 shows yet another design of a liquefaction plant 12*f* that may be incorporated in an embodiment of the LNG liquefaction unit 10. Here the plant 12*f* has a mixed refrigerant compression circuit like that shown in FIGS. 6 and 7 in that it includes a separator 31 following the high pressure compressor 22 and cooler 30. However, the plant 12*f* differs from that in FIGS. 6 and 7 by the provision of a third three pass heat exchangers H1, H2 and H3.

A first pass or channel C1 of each heat exchanger H1, H2 and H3 receives a feed of the natural gas from connector 16*a*. A second pass or channel C2 of each heat exchanger H1, H2 and H3 receives a mixed refrigerant "MR" again which the natural gas is cooled and liquefied.

The respective third passes or channels C31, C32, C33 of the heat exchangers H1, H2 and H3 respectively receive different refrigerant fractions which are precooled against the mixed refrigerant MR flowing through the second passes or channels. Moreover, the heavy fraction of refrigerant from the separator 28 flows through the third channel C31 of the heat exchanger H1. The heavy fraction of refrigerant from the separator 31 flows through the third channel C32 of the heat exchanger H2. And the light fraction of refrigerant from the separator 31 flows through the third channel C33 of the heat exchanger H3.

These refrigerant fractions after passing through the respective heat exchangers flow-through respective valves V1, V2 and V3 and are combined to form the mixed refrigerant MR which passes through each of the heat exchangers H1, H2 and H3.

In the plant 12*f* no valves are shown for controlling the proportion of the natural gas flowing to each of the heat exchangers H1, H2 and H3 allowing the flows to heat exchangers to self-balance. However, in a variation three independent natural gas valves can be incorporated to control the proportion of natural gas to each of the heat exchangers. This will provide control of the hot side cooling curve in the heat exchangers H1, H2 and H3.

It is envisaged that the containerised LNG liquefaction unit 10 can be configured to provide LNG to fixed flow rate of between about 0.01 MPTA to 0.3 MPTA. For example, the unit 10 may be configured to provide a liquefaction capacity of 0.05 MPTA. Therefore, an LNG production facility having a 10 MPTA production rate would require two hundred (200) 0.05 MPTA containerised LNG liquefaction units 10.

As previously mentioned the units 10 are likely to be heavier than the standard ISO container of the same dimensions. Nevertheless, the units 10 can be handled in a similar manner to regular ISO containers and therefore stacked and moved by use of cranes and other lifting machines and vehicles including forklift trucks, however the cranes and machines need to be rated for the additional weight. In this way large numbers of units 10 can be stacked into one or more banks.

Figure 12:
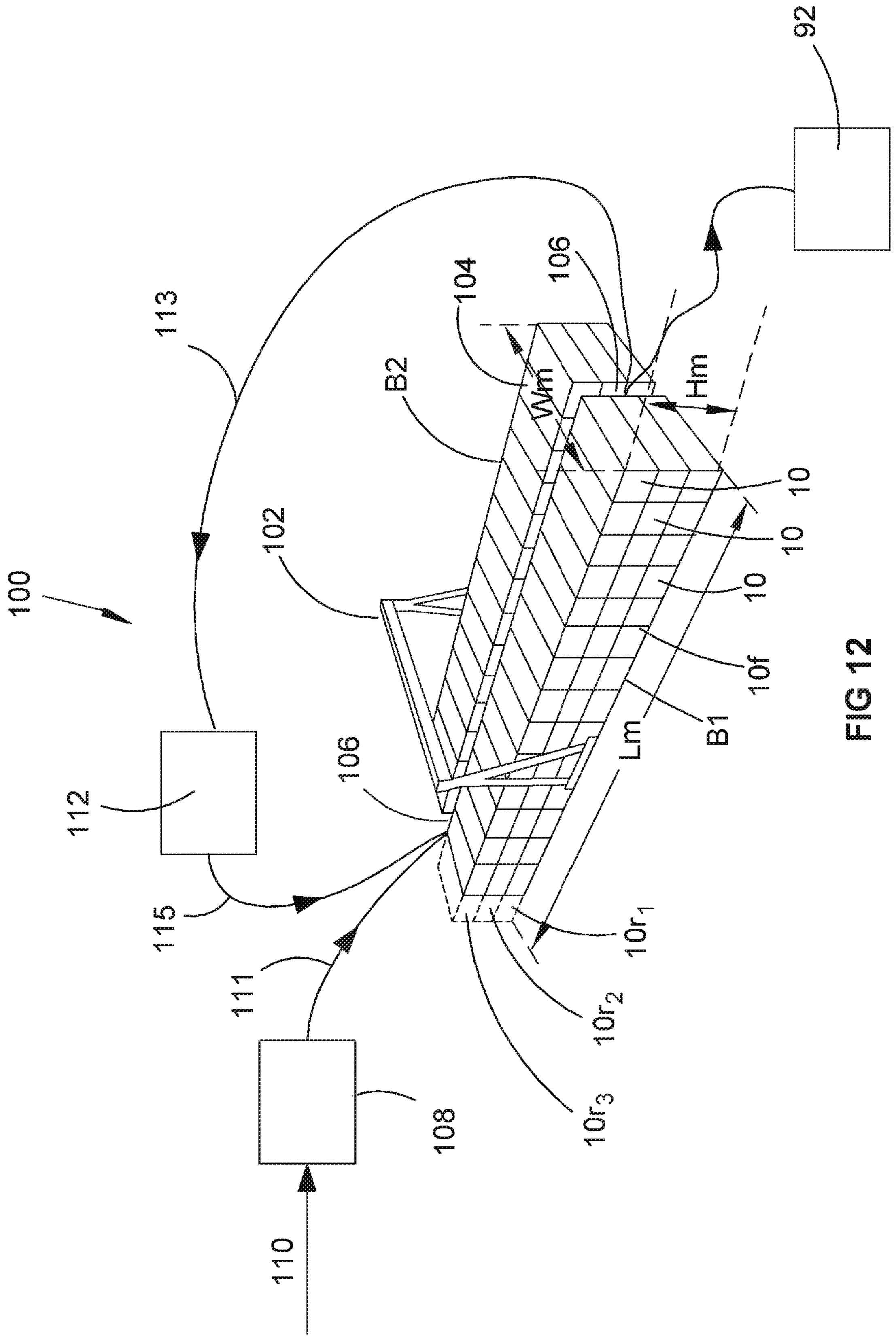
FIG. 12 is a schematic representation of a 9.9 MPTA LNG production facility incorporating 200 of the disclosed LNG liquefaction units wherein each liquefaction unit has a nominal LNG production capacity of 0.05 MPTA.

FIG. 12 illustrates an LNG production plant 100 which incorporates a plurality of the containerised LNG liquefaction units 10. Since the plant 100 comprises a plurality of units 10 the LNG production from the plant 100 can be increased (or indeed decreased) in incremental units equal to the capacity of the units 10. This enables the plant 100 to be relatively easily scaled up as the production of feed gas increases, or further sources of feed gas are added.

In this example the plant 100 incorporates one hundred and ninety eight (198) containerised LNG liquefaction units 10. The units 10 are arranged in two banks B1 and B2 each having ninety nine (99) liquefaction units 10. Each bank B1, B2 is made up of three stacked rows of units 10, where each row is made up of thirty three (33) side-by-side units 10. When each unit 10 has a liquefaction capacity of 0.05 MPTA the overall capacity of the plant 100 is 9.9 MPTA.

A travelling gantry crane 102 is provided at the plant 100 to facilitate the handling of the units 10. The crane 102 can lift and move the units 10 to construct the banks B1 and B2. The banks B1 and B2 are formed parallel to each other and are spaced apart to form a corridor 104 between the banks. A manifold system 106 runs on the corridor 104 and is used for connecting feed gas, and other services, utilities and power to each of the individual units 10 which form the banks. To this end when the banks are constructed the individual units 10 are orientated so that their respective common walls 11 face into the corridor 104. This facilitates easy connection between the manifold 106 and the connectors 16, all of which are on the wall 18. When in this orientation the major length X of each unit is orthogonal to the length L of the respective banks.

In the embodiment exemplified in FIG. 12 the overall length L of the side-by-side banks B1 and B2 for the 9.9 MPTA LNG plant 100 is about 80 m, the overall height H is around 9 m and the width W inclusive of the corridor 104 is about 40 m. Thus, the footprint required for the liquefaction facility is about 3200 $m^2$. In comparison the footprint for an equivalent stick built liquefaction facility is in the order of 10,500 $m^2$ (inclusive of fin fans).

The plant 100 is illustrated as also comprising a pre-treatment facility 108 for providing one or more pre-treatment steps to a gas feed stream 110. The pre-treatment facility 108 can for example provide for the removal of one or more of: water, sour gases (e.g. $CO_2$ and $H_2S$), mercury, and heavy hydrocarbons C5+. The pre-treated feed gas is provided by conduit 111 to the manifold 106 for subsequent distribution to the respective units 10.

A heat exchanger 112 is provided for cooling the water returned from the coolers 26 and 30. The heat exchanger 112 may be in the form of a building housing a plurality of finned radiators and one or more large air fans. Water from the coolers 26 and 30 is delivered from each unit 10 by its conduit 96 and connector 16*f* via the manifold 106 and a conduit 113 to the heat exchanger 112 where it flows through the radiators and is air or water cooled. The cooled water is then fed to the respective units 10 via a conduit 115 and the manifold 106 to their connectors 16*e* where it can flow through conduit 94 to the respective coolers 26 and 30.

The manifold system 106 interconnects the units 10 to another systems and facilities of the plant 100 including the pre-treatment facility 108, the heat exchanger 112 and the LNG storage facility 92. In addition the manifold system 106 distributes electrical power from an electrical power source (not shown). The form or type of the electrical power source is not critical to the operation of the units 10. The power source could for example comprise one of, or combination of any two or more of, a: standalone fossil fuel generation plant, including boil off gas or LNG; a substation of a remote power generation facility; geothermal plant; hydro-electric plant; solar electric power plant; a wind power plant; or a wave power plant.

The units 10 are specifically designed as maintenance free and not intended to enable people to enter the units 10 once commissioned for service or maintenance. As a consequence, the equipment within the containers 14 can be configured with a view to making the most efficient use of the available space rather than allowing human access to equipment within the containers for maintenance and repair. In one method of use it is envisaged that in the event of a unit 10 developing a fault, the unit is simply switched out of the overall plant by disconnecting it from the manifold 106. This can be via a physical disconnection between the manifold and the connectors 16 or by operation of respective valves and switches either in: a connection umbilical from the manifold to each unit 10; or, the respective connectors.

A faulty unit 10 can be either removed from a bank B1, B2, or simply left in the bank and another unit 10 added or otherwise connected to the manifold 106. To this end when constructing the LNG production plant 100 one or more redundant units 10*r* can be provided to minimise the time of reduced production capacity in the event of a faulty unit 10. For example, with reference to FIG. 12 assume that a unit 10*f* develops a fault and is disconnected from the manifold 106, and that three redundant units 10*r*1, 10*r*2 and 10*r*3 were provided as redundant units at one end of the bank B1. The unit 10*f* is in the bottom row of units in the bank B1.

The operator of the plant 100 can disconnect the units 10*f* and connect in say unit 10*r*1. This could be done almost instantaneously if the units 10*r*1-10*r*3 are pre-connected to the manifold 106 and all that is required is the switching or turning on/off of various switches and valves either in the connectors 16, or in an umbilical between the manifold 106 and the connectors 16. If the operator wants to physically remove the faulty unit 10*f*, they could then:

- switch in the two other redundant units 10*r*2 and 10*r*3;
- switch out the two non-faulty units 10 immediately above the faulty unit 10*f*, and if not already accomplished by the "switch out" physically disconnect the non-faulty units 10 from the manifold 106;
- use the gantry crane 102 to physically remove the unit 10*f* and the two non-faulty units immediately above;
- use the gantry crane 102 to place the two non-faulty units back in the bank B1 together with a fresh unit 10; and
- either: reconnect the non-faulty units and the fresh unit to the manifold 106 and disconnect the redundant units 10*r*1-10*r*3; or maintain the connection of the redundant units with the manifold 106 and now use the two non-faulty units and the fresh unit as redundant units.

It should be understood from the above description that the units 10 facilitate a method of constructing an LNG production plant at a production site by connecting or disconnecting discrete LNG liquefaction capacity as required to match the mass flow rate of gas in the feed stream 110. This is believed to have an enormous economic benefit as it allows LNG production and thus a revenue stream with very low initial capex at a substantially earlier time than would otherwise be the case as well as enabling a plant operator to establish production contracts earlier than would otherwise be the case and thereby obtain substantial advantage over competitive operators.

Whilst a specific embodiment of the containerised LNG liquefaction unit 10 and associated production plant 100 have been described it should be appreciated that unit 10 and plant 100 may be embodied in many other forms.

For example, in relation to the unit 10, two separate compressor bodies, one for the low pressure compressor 20, and one for the high pressure compressor 22 are shown. However, both low pressure and high pressure compression can be provided within a single body having multiple stages. Further, instead of a single motor driving both high pressure and low pressure compressors/stages separate motors can be provided one for each compression stage. Is further believed that the overall size of each unit can be reduced further by provision of high-speed motors for example running at more than 4,000 RPM, for example 25,000 RPM. Additionally, each unit 10 can be provided with its own pre-treatment facility thereby avoiding the need for the shared facility 108 currently illustrated in FIG. 12. Alternately each unit 10 can be provided with a selected pre-treatment facility is, for example for the removal of carbon dioxide.

Also, the units 10 are described as providing LNG at the outlet connector 16*b* at a pressure of one bar and temperature of about −161° C. However, units 10 can be configured and operated to provide the LNG at a higher pressure and a high temperature which may then be transported on pressurised vessels and chilled and depressurised while in transit to −161° C. and 1 bar. In this variation the units 10 may be operated to provide cooled compressed natural gas rather than LNG.

Further the unit 10 is shown as having a common wall 11 with a number of separate connectors 16. However, a single multi-port connector enabling the simultaneous connection with all, or a subset of, the services and utilities connected to the unit 10 can be used, rather than having an individual connector for each of the services/utility as currently shown in FIG. 1. For example, a multiport connector can be provided to enable connection for each one of the services and utilities connected by the separate connectors 16*a*-16*g* currently shown on the common wall 11 of the container 14 in FIG. 1.

FIG. 12 illustrates a plant 100 comprises a plurality of units 10 stacked into banks B1 and B2. However, when a plurality of units 10 are used it is not mandatory that they are stacked. Stacking provides advantages in terms of reducing the footprint of the plant 100. If footprint size is not of importance or significance then the units 10 need not be stacked.

Additional connectors for further services or utilities may be provided on the container 14. For example, an air port or connector may be incorporated to enable the purging of inert gas from within the container 14 prior to allowing people to open up equipment/piping for maintenance/refurbishment.

Further possible variations to the above described embodiments include:

- The combining of the heat exchangers 17 and 18 into a single heat exchanger.
- Providing the manifold system 106 in a structure and/or configuration which extends about the outside of the banks B1 and B2 rather than through the corridor between the banks B1 and B2. Options here include forming the manifold 106 as a bifurcated structure or alternately as an open loop.

Providing the manifold system 106 as a plurality of separate manifolds or umbilicals. For example, one manifold can be provided for providing the natural gas feed stream to each of the units 10, another manifold can be provided for feeding the LNG from each of the units 10 to 30 storage facility 92, and another manifold or umbilical can be provided for supplying electrical power and the inert fluid to each of the units 10, while also providing a flow path for the heat transfer fluid which is cooled in the external heat exchanger 112.

While FIG. 12 illustrates the use of a gantry crane for movement and stacking of the containers 14 naturally different types of cranes can be used.

FIGS. 5-11 depict various possible SMR circuits for liquefaction plants in different embodiments of the containerised units 10. However the circuits shown in these figures are not limited to application only in the container is units 10. Additionally it should be understood that the aspect ratio of >1 for the heat exchangers is an optional characteristic which may have particular application when the liquefaction plants are in the containerised units 10 as described herein.

In the claims which follow, and in the preceding description, except where the context requires otherwise due to express language or necessary implication, the word "comprise" and variations such as "comprises" or "comprising" are used in an inclusive sense, i.e. to specify the presence of the stated features but not to preclude the presence or addition of further features in various embodiments of the unit, plant and method as disclosed herein.

The invention claimed is:

1. A containerised liquefied natural gas (LNG) liquefaction unit comprising:

a LNG liquefaction plant comprising a main cryogenic heat exchanger (MCHE) that is configured to liquefy a feed stream gas, and a closed loop refrigerant circuit that passes through the main cryogenic heat exchanger;

a transportable container, wherein at least the main cryogenic heat exchanger (MCHE) and the closed loop refrigerant circuit of the LNG liquefaction plant are wholly contained within the transportable container, the transportable container being hermetically sealed; and a plurality of connectors supported on the container, the plurality of connectors arranged to enable separate and isolated flow of services, fluids and utilities, and the plurality of connectors arranged to enable the feed stream gas to flow into the container, a flow of LNG out of the container and connection of the LNG liquefaction plant to the external source of electrical power, the plurality of connectors including:

a feed gas inlet connector that is configured to enable the feed stream gas to flow into the container;

a LNG outlet connector that is configured to enable the flow of LNG out of the container;

a heat transfer fluid inlet port; and an outlet port enabling the removal of heat energy from the container;

wherein the main cryogenic heat exchanger (MCHE) includes an inlet to receive the feed stream gas from the feed gas inlet connector, and an outlet through which LNG exits the main cryogenic heat exchanger (MCHE) and is subsequently fed to the LNG outlet connector.

2. The containerised LNG liquefaction unit according to claim 1, further comprising a monitoring system capable of monitoring status and performance of the LNG liquefaction plant and providing remotely accessible status and performance information pertaining to the liquefaction unit.

3. The containerised LNG liquefaction unit according to claim 2, wherein the monitoring system is further capable of monitoring environmental characteristics within the container including one or more of:

atmospheric pressure within the container;

composition of the atmosphere in the container;

temperature within the container; and temperature of one or more selected components of the LNG liquefaction plant.

4. The containerised LNG liquefaction unit according to claim 1, wherein the refrigerant circuit includes at least one compressor and at least one electric motor for driving the at least one compressor.

5. The containerised LNG liquefaction unit according to claim 4, wherein the MCHE has an aspect ratio of ≥1, where the width and/or depth is greater than the height.

6. The containerised LNG liquefaction unit according to claim 4, wherein a duty cycle of the MCHE is split across two or more separate heat exchangers.

7. The containerised LNG liquefaction unit according to claim 6, wherein each separate heat exchanger has an aspect ratio of ≥1.

8. The containerised LNG liquefaction unit according to claim 4, wherein the MCHE is arranged to operate with a thermal stress of up to 100° C. per metre in a vertical direction.

9. The containerised LNG liquefaction unit according to claim 4, wherein the at least one compressor comprises a low-pressure compressor and a high pressure compressor.

10. The containerised LNG liquefaction unit according to claim 9, wherein the at least one motor comprises a single motor which drives both the low-pressure compressor and the high pressure compressor.

11. The containerised LNG liquefaction unit according to claim 4, wherein the refrigerant circuit includes at least one separator for separating liquid and gas phases of the refrigerant, wherein the at least one separator has an aspect ratio of greater ≥1.

12. A method of constructing a LNG production plant at a production site comprising:

using a manifold to connect or disconnect a plurality of containerised LNG liquefaction units, each containerised LNG liquefaction unit being in accordance with claim 1, together to enable a discrete incremental change in LNG liquefaction capacity as required to match a mass flow rate of natural gas in a natural gas feed stream; and conducting through the manifold:

a flow of natural gas from the natural gas feed stream and electrical power to connected ones of the containerised LNG liquefaction units; and LNG liquefied by the connected ones of the containerised LNG liquefaction units to a LNG storage facility.

13. The method according to claim 12, further comprising stacking the one or more containerised LNG liquefaction units to form one or more banks of stacked containerised LNG liquefaction units.

14. The method according to claim 13, wherein the stacking comprises autonomously stacking the one or more containerised LNG liquefaction units to form the one or more banks.

15. The method according to claim 12, further comprising using the manifold to connect the containerised LNG liquefaction units to: (a) a heat transfer fluid circuit arranged to enable a flow of a heat transfer fluid through each of the connected containerised LNG liquefaction units and an external heat exchanger; (b) a power supply; (c) a LNG storage facility; and (d) a supply of an inert gas.

16. The containerised LNG liquefaction unit according to claim 1, wherein the one or more connectors includes any one or both of: (a) a drain enabling removal of gases or liquids from the container, and (b) one or more utility fluid port enabling supply of fluids to facilitate operation of equipment and/or instrumentation of the LNG liquefaction plan.

17. The containerised LNG liquefaction unit according to claim 4, wherein the electric motor is arranged to rotate the at least one compressor a speed of at least 4,000 rpm or up to about 25,000RPM.

18. The containerised LNG liquefaction unit according to claim 11, further comprising at least one intercooler in the refrigerant circuit between the at least one compressor and the at least one separator.

19. The containerised LNG liquefaction unit according to claim 1, further comprising a kill port arranged to facilitate the injection of a material capable of preventing air from accumulating in, or displacing air from, the container.

20. The containerised LNG liquefaction unit according to claim 1, wherein the LNG liquefaction plant is configured to produce up to 0.30 MTPA of LNG.

21. The LNG liquefaction unit of claim 1, wherein each of the connectors is provided on a common wall of the container.

22. A liquefied natural gas (LNG) production plant comprising:

a plurality of containerised LNG liquefaction units according to claim 1, each containerised LNG liquefaction unit arranged to produce a predetermined quantity of LNG in the order of 0.01 to 0.30 MTPA; and a manifold system enabling connection between the plurality of containerised LNG liquefaction units and at least one of:

a feed stream of natural gas;

a source of electrical power; and an LNG storage facility.

23. The LNG production plant according to claim 22, wherein the manifold system enables connection between the plurality of containerized LNG liquefaction units and the feed stream of natural gas, and the LNG production plant further comprises a pre-treatment facility arranged to remove one or a combination of any two or more of: water, sour gases, mercury and carbon dioxide from the feed stream of natural gas prior to liquefaction.

24. The LNG production plant according to claim 22, wherein some of the plurality of LNG liquefaction units are stacked on top of each other to form a bank of stacked LNG liquefaction units.

25. The LNG production plant according to claim 24, further comprising:

at least one bank of stacked LNG liquefaction unit;

wherein the manifold system runs adjacent to the at least one bank of the LNG liquefaction units.

26. The LNG production plant according to claim 25, wherein the at least one bank comprises at least two banks of the stacked LNG liquefaction units, and the manifold system runs between mutually adjacent banks or about an outside of the banks.

27. The LNG production plant according to claim 22, wherein the LNG liquefaction units and the manifold system are arranged to enable one face of every LNG liquefaction unit to be directly accessible to the manifold system.

28. The LNG production plant according to claim 24, wherein:

each LNG liquefaction unit has a length Xm, a height Ym, and a width Zm, where Xm>Ym;

each bank has a length Lm, a height Hm, and a width Wm, where Lm>Wm; and in each bank, a length direction of each liquefaction unit is perpendicular to a length direction of the bank.

29. The LNG production plant according to claim 24, further comprising one or more cranes configured to construct and de-construct each bank of LNG liquefaction units.

30. The LNG production plant according to claim 29, wherein the one or more cranes comprises a gantry crane which spans a width of the LNG production plant, the gantry crane configured to place an LNG liquefaction unit in a bank or remove an LNG liquefaction unit from a bank.

* * * * *